(12) United States Patent
Sharma et al.

(10) Patent No.: US 11,016,899 B2
(45) Date of Patent: May 25, 2021

(54) SELECTIVELY HONORING SPECULATIVE MEMORY PREFETCH REQUESTS BASED ON BANDWIDTH STATE OF A MEMORY ACCESS PATH COMPONENT(S) IN A PROCESSOR-BASED SYSTEM

(71) Applicant: QUALCOMM Incorporated, San Diego, CA (US)

(72) Inventors: Nikhil Narendradev Sharma, Apex, NC (US); Eric Francis Robinson, Raleigh, NC (US); Garrett Michael Drapala, Cary, NC (US); Perry Willmann Remaklus, Jr., Raleigh, NC (US); Joseph Gerald McDonald, Raleigh, NC (US); Thomas Philip Speier, Wake Forest, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/403,701

(22) Filed: May 6, 2019

(65) Prior Publication Data
US 2020/0356486 A1   Nov. 12, 2020

(51) Int. Cl.
*G06F 13/00*      (2006.01)
*G06F 12/0862*   (2016.01)

(52) U.S. Cl.
CPC .. *G06F 12/0862* (2013.01); *G06F 2212/1041* (2013.01); *G06F 2212/507* (2013.01)

(58) Field of Classification Search
CPC ......... G06F 12/0862; G06F 2212/1041; G06F 2212/507
See application file for complete search history.

(56) References Cited

U.S. PATENT DOCUMENTS

| 10,169,240 B2 | 1/2019 | Dwiel et al. | |
| 2003/0229762 A1* | 12/2003 | Maiyuran | G06F 13/161 |
| | | | 711/137 |
| 2020/0065247 A1* | 2/2020 | Choudhary | G06F 12/0811 |

OTHER PUBLICATIONS

Wulf, W. et al., "Hitting the Memory Wall: Implications of the Obvious," ACM SIGARCH Computer Architecture News, vol. 23, No. 1, Mar. 1995, pp. 20-24.
U.S. Appl. No. 16/113,185, filed Aug. 27, 2018.

* cited by examiner

*Primary Examiner* — Jing-Yih Shyu
(74) *Attorney, Agent, or Firm* — Withrow & Terranova, PLLC

(57) ABSTRACT

Selective honoring of speculative memory-prefetch requests based on bandwidth constraint of a memory access path component(s) in a processor-based system. To reduce memory access latency, a CPU includes a request size in a memory read request of requested data to be read from memory and a request mode of the requested data as required or preferred. A memory access path component includes a memory read honor circuit configured to receive the memory read request and consult the request size and request mode of requested data in the memory read request. If the selective prefetch data honor circuit determines that bandwidth of the memory system is less than a defined bandwidth constraint threshold, then the memory read request is forwarded to be fulfilled, otherwise, the memory read request is downgraded to only include any requested required data.

38 Claims, 15 Drawing Sheets

SELECTIVELY HONORING SPECULATIVE MEMORY PREFETCH REQUESTS BASED ON BANDWIDTH STATE OF A MEMORY ACCESS PATH COMPONENT(S) IN A PROCESSOR-BASED SYSTEM

BACKGROUND

I. Field of the Disclosure

The technology of the disclosure relates generally to memory access requests to memory systems in a processor-based system, and more particularly to speculative prefetching of memory data from cache memory and/or system memory to reduce memory read latency.

II. Background

Central processing units (CPUs), also known as microprocessors, perform computational tasks in a wide variety of applications. A typical CPU includes one or more processor cores that are each configured to execute software instructions. The software instructions may instruct a processor core to fetch data from a location in memory (e.g., a dynamic random access memory (DRAM)) as part of a memory read operation, perform one or more CPU operations using the fetched/read data, and generate a result. The result may then be stored back into memory as a memory write operation. Thus, the latency of CPU operations that involve memory accesses are affected by not only the CPU's workload performance but also memory speed (i.e., latency). One way to improve CPU workload performance by reducing memory latency is to employ cache memory as part of the memory system. Even so, while the rate of improvement in CPU speed and the rate of improvement in memory speed (e.g., through use of cache memory) have both increased over time, CPU speed has and continues to improve at a faster rate than memory speed. Thus, a CPU's workload performance is tied to wait time for data to be accessed from memory in a memory read operation. This has increased pressure on processor system bandwidth as being limited by memory bandwidth. Further, with the advent of the superscalar out-of-order processors, aggressive processor design techniques that exploit memory level parallelism and data prefetching have been realized, thus leading to multiple CPUs having the ability to send multiple memory access requests simultaneously to shared memory. This has further increased pressure on the processor system bandwidth.

A conventional approach to improve superscalar out-of-order processor performance is to design the CPUs to detect and request data speculatively from the memory system so as to hide the memory access latency. This technique is called data prefetching. Data prefetching is a technique in which a prefetcher (also known as a prefetch engine circuit) is provided to make predictions on memory addresses that will be accessed in the near future for memory read operations. The prefetcher can be configured to detect memory access patterns to predict future memory accesses. Using these predictions, the prefetcher will make requests to a higher level memory to speculatively preload cache or system memory lines into a lower-level cache memory. Cache lines stored at these memory addresses are brought into a lower-level cache memory before they are actually demanded. Two common aspects to data prefetching are, first, to have a larger cache line/block size to help exploit the characteristic of spatial locality commonly found in modern day applications, and second, to predict future memory accesses and speculatively issue requests for these predicted memory blocks. Spatial locality here is defined as, if a storage location is referenced at a particular time, then it is likely that nearby memory locations will be referenced in the near future.

Ideally, prefetched data from speculative memory requests would all get used by an application being executed before being evicted from cache memory. However, speculatively perfected data does not always get used, thus contributing to cache pollution. Data speculatively prefetched for applications may have different useful rates, because different applications have varying behavior. For example, a pointer chasing application might not have good spatial locality, causing a memory system designed to move larger cache line/block sizes to unnecessarily put pressure on system bandwidth as only a part of each prefetched cache line may get used. A similar case can be made for predicting future memory accesses, because any inaccurate or untimely prefetch requests could hurt CPU performance. Useless prefetching adds contention to what may be an already constrained memory system resource in a processor-based system, thus unnecessarily increasing queueing delays and pressure on the system, which in turn can delay regular memory requests. Useless prefetching can also cause thrashing and waste cache capacity, thus increasing the load on a processor-based system even further.

SUMMARY OF THE DISCLOSURE

Aspects disclosed herein include selectively honoring speculative memory prefetch requests based on bandwidth constraint of a memory access path component(s) in a processor-based system. A processor in the processor based system is provided that includes one or more central processing units (CPU) and a memory system that can include shared cache memory and main system memory for storing data accessed through memory read operations issued by the CPU(s). The memory system can include one or more levels of shared cache memory and system memory accessible to the CPU(s). In exemplary aspects disclosed herein, a CPU acting as a requesting CPU issues a memory read request at a memory address to access memory data stored in the memory system at the memory address. The memory read request can be a memory read operation for an executed instruction or a speculative memory read operation to prefetch data from memory. The memory read request is forwarded down a cache memory hierarchy, eventually reaching system memory, all as memory access path components if cache misses occur in the cache memory. However, memory access path components in the memory system can be bandwidth constrained, especially if there are shared components between multiple CPUs in a processor and/or between multiple processors in a chip-to-chip access. Examples of these memory access path components in a memory system that can be bandwidth constrained include cache memory, a memory controller controlling access to system memory, and a transport interface circuit that forwards memory access requests between different processors in a multi-processor system. Bandwidth constraint in such memory access path components contributes to memory access latency.

In this regard, as an example disclosed herein, to reduce memory access latency in a processor-based system, a CPU issuing a memory read request to initiate a memory read operation includes as part of the memory read request a request size of the requested data to be read from memory and a request mode of the requested data. The request size is a byte size that can be up to the byte size of memory line (e.g., a cache line) of data that can be read from the memory system in one read request, since the data needed for the memory read operation may not be the full byte size of the memory line. The request mode indicates if the data at the requested memory address, or sector of the requested memory address, is required or only preferred. Required mode data is data at the requested memory address, or sector of the requested memory address, required by a CPU to execute an instruction, speculative fetched data that the requesting CPU deems required, or speculatively prefetched data the CPU deems required (e.g., highly predicted to be used before being evicted from cache memory). For example, the CPU may employ a prefetch prediction circuit configured to predict the usefulness of preferred mode data. Preferred mode data can be additional data that is returned from a memory access request of the requested required data being less in size than the full memory line size of the memory system, and/or data that the requesting CPU is speculating to be used based on a prediction that is not deemed required. At least one memory access path component in the memory system includes a memory read honor circuit that is configured to receive the memory read request and consult the request size and request mode of requested data in the memory read request. If the memory read request includes a preferred mode for any requested data, the selective prefetch data honor circuit is configured to determine a bandwidth state in the memory system to determine if the request for preferred data will be forwarded. For example, the bandwidth state may be the bandwidth of a cache memory, memory controller, and/or a recipient processor. If the determined bandwidth state indicates a bandwidth that is less than a defined bandwidth constraint threshold, the memory read honor circuit is configured to forward the memory access request, including the requested preferred data to be fulfilled. However, if the determined bandwidth state indicates a bandwidth that is greater than the defined bandwidth constraint threshold, the memory read honor circuit is configured to downgrade the memory read request to only include any requested required data. If the memory access request does not include any requested required data, the memory read honor circuit may be configured to not forward (i.e., drop) the memory read request altogether. In this manner, requested preferred data in memory read requests is only fulfilled if such would not exceed the defined bandwidth constraint of the processor-based system in order to conserve memory access bandwidth and improve CPU performance.

In certain examples disclosed herein, the line size of the memory system can include multiple sectors. For example, a memory system may have a 128 byte memory line size with two (2) 64 byte sectors per memory line. Thus, in certain examples, a requesting CPU can include the request mode in a memory read request as either required or preferred to be the same or different for each sector. The memory read honor circuit can be configured to selectively honor or drop the read requests on a per sector basis in the memory read request based on the individual request modes of the sectors and the determined bandwidth state.

In this regard, in one exemplary aspect, a system comprising a memory read honor circuit communicatively coupled to a memory access path is provided. The memory read honor circuit is configured to intercept, from the memory access path, a memory read request issued by a central processing unit (CPU). The memory read request comprises a memory address indicating an address of requested data in a memory system and a request mode for the requested data. The memory read honor circuit is further configured to determine the request mode for the requested data in the received memory read request. In response to the request mode of the requested data in the received memory read request indicating a preferred request state, the memory read honor circuit is further configured to determine a bandwidth state in the memory system, determine if the determined bandwidth state exceeds a defined bandwidth constraint threshold of the memory system, and, in response to the determined bandwidth state exceeding the defined bandwidth constraint threshold of the memory system, remove the requested data from the memory read request.

In another exemplary aspect, a method of selectively honoring a memory read request issued by a central processing unit (CPU) to a memory system in a processor-based system is provided. The method comprises intercepting, from a memory access path in the memory system, a memory read request issued by the CPU, the memory read request comprising a memory address indicating an address of requested data in the memory system and a request mode for the requested data. The method further comprises determining the request mode for the requested data in the received memory read request. In response to the request mode of the requested data in the received memory read request having a request mode indicating a preferred request state, the method further comprises determining a bandwidth state in the memory system, determining if the determined bandwidth state exceeds a defined bandwidth constraint threshold of the memory system, and, in response to the determined bandwidth state exceeding the defined bandwidth constraint threshold in the memory system, the method further comprises removing the requested data from the memory read request.

In another exemplary aspect, a processor-based system is provided, the system comprising a processor comprising an interconnect bus and at least one cache memory communicatively coupled to the interconnect bus. The processor-based system also comprises a memory system communicatively coupled to the interconnect bus and comprising a memory access path comprising the at least one cache memory, a system memory, and a memory controller communicatively coupled to the interconnect bus and the system memory, the memory controller configured to control memory accesses over the memory access path to the system memory. The processor-based system also comprises at least one CPU communicatively coupled to the interconnect bus, the at least one CPU configured to issue a memory access request over the interconnect bus to the memory access path to access the memory system. The processor-based system also comprises a memory read honor circuit communicatively coupled to the memory access path in the memory system. The processor-based system also comprises a requesting CPU among the at least one CPU configured to issue a memory read request over the interconnect bus to the memory system, the memory read request comprising a memory address indicating an address of requested data in the memory system and a request mode for the requested data. The memory read honor circuit is configured to intercept, from the memory access path in the memory system, the memory read request issued by the requesting CPU and determine the request mode for the requested data in the received memory read request. In response to the request mode of the requested data in the received memory read request having a request mode indicating a preferred request state, the memory read honor circuit is further configured to determine a bandwidth state in the memory system, determine if the determined bandwidth state exceeds a defined bandwidth constraint threshold of the memory system, and, in response to the determined bandwidth state exceeding the defined bandwidth constraint threshold in the memory system, remove the requested data from the memory read request.

DETAILED DESCRIPTION

Figure 1:
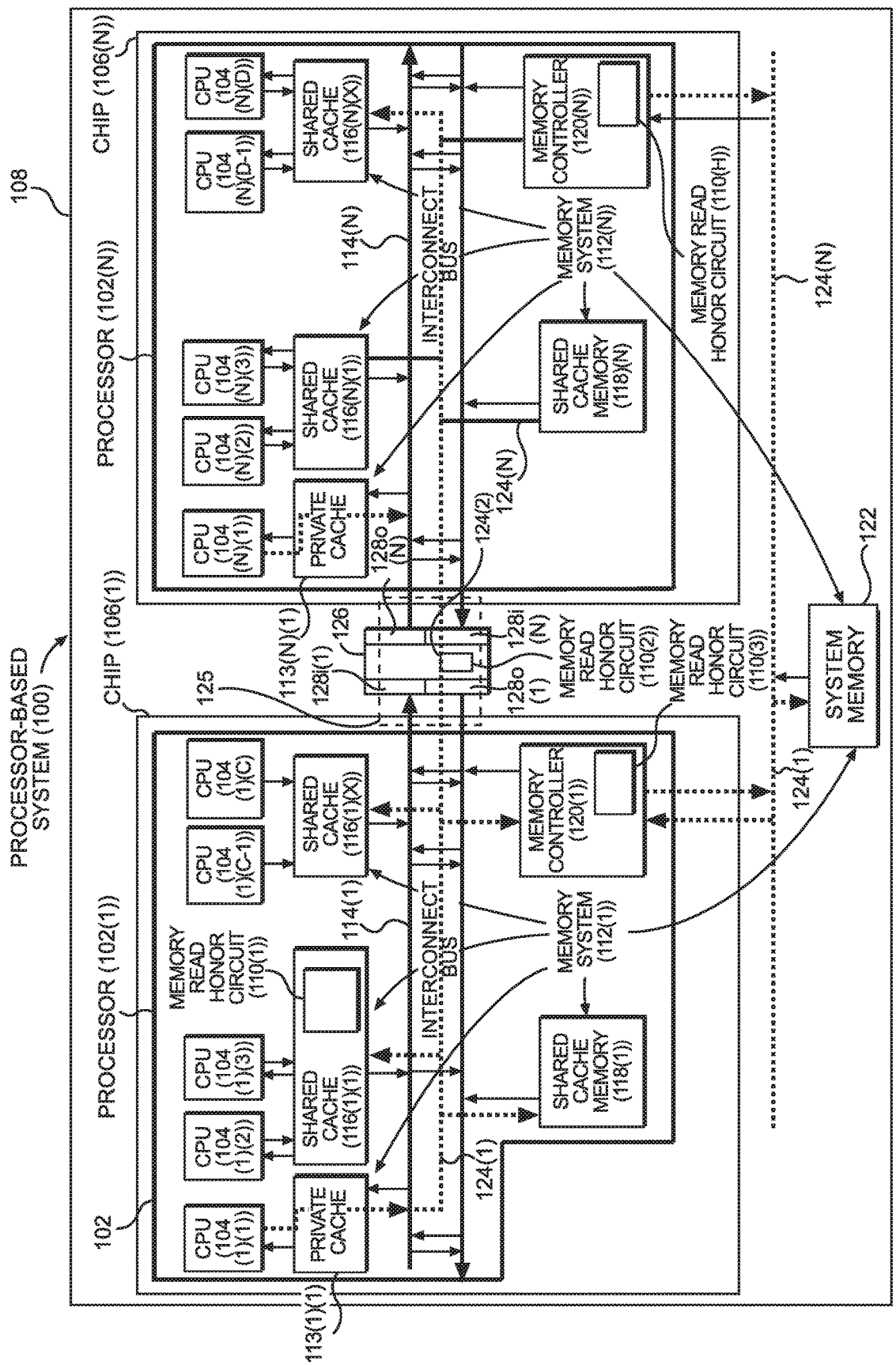
FIG. 1 is a schematic diagram of an exemplary processor-based system that includes multiple processors, with each processor including one or more central processing units (CPUs) and supporting inter-processor communications to access shared memory resources, and further including at least one memory read honor circuit in at least one memory access path component configured to selectively forward requested preferred data in a memory read request issued by a CPU based on the determined bandwidth in the memory system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include selectively honoring speculative memory prefetch requests based on bandwidth constraint of a memory access path component(s) in a processor-based system. In this regard, FIG. 1 illustrates an example of a processor-based system 100 that includes a plurality of processors 102(1)-102(N) each including one or more respective central processing units (CPUs) 104(1)(1)-104(1)(C), 104(N)(1)-104(N)(D). 'N', 'C', and 'D' is a whole positive integer representing that any number of processors can be included in the processor-based system 100 and any number of CPUs 104 within each processor 102. Each processor 102(1)-102(N) may be included in its own respective separate semiconductor die or integrated circuit (IC) chip 106(1)-106(N), which can be packaged in a multi-chip package 108. The processor-based system 100 in FIG. 1 can include one or more memory read honor circuits 110(1)-110(H). As will be discussed in more detail below, the memory read honor circuits 110(1)-110(H) are each configured to selectively honor speculative memory prefetch requests from a requesting CPU 104(1)(1)-104(1)(C), 104(N)(1)-104(N)(D) in a processor 102(1)-102(N) to a memory system 112(1)-112(N) based on a determined bandwidth state of a memory access path in the processor-based system 100. If the determined bandwidth state indicates a bandwidth that is less than a defined bandwidth constraint threshold, then the memory read honor circuit 110(1)-110(H) is configured to forward the memory access request to a memory component in the processor-based system 100 to be fulfilled. However, if the determined bandwidth state indicates a bandwidth that is greater than the defined bandwidth constraint threshold, then the memory read honor circuit 110(1)-110(H) is configured to downgrade the memory read request to only include any requested required data by the requesting CPU 104(1)(1)-104(1)(C), 104(N)(1)-104(N)(D). If the determined bandwidth state indicates a bandwidth that is equal to the defined bandwidth constraint threshold, then the memory read honor circuit 110(1)-110(H) can be configured to, based on design preference, either forward the memory access request to a memory component in the processor-based system 100 to be fulfilled or downgrade the memory read request to only include any requested required data by the requesting CPU 104(1)(1)-104(1)(C), 104(N)(1)-104(N)(D). If the memory access request does not include any requested required data, then the memory read honor circuit 110(1)-110(H) may be configured to not forward (i.e., drop) the memory read request altogether. In this manner, requested preferred data in memory read requests by the CPU 104(1)(1)-104(1)(C), 104(N)(1)-104(N)(D) are only fulfilled if such would not exceed a defined bandwidth constraint of the processor-based system 100 to conserve memory access bandwidth and improve performance.

Before discussing the exemplary aspects of the memory read honor circuits 110(1)-110(H) in the processor-based system 100 being configured to selectively honor speculative memory prefetch requests from a requesting CPU 104(1)(1)-104(1)(C), 104(N)(1)-104(N)(D) based on a determined bandwidth state of a memory access path in the processor-based system 100, other exemplary aspects of the processor-based system 100 are first discussed below.

In the example in FIG. 1, each processor 102(1)-102(N) includes a corresponding hierarchal memory system 112(1)-112(N) that contains memory components configured to store data and be accessed by requesting CPUs 104(1)(1)-104(1)(C), 104(N)(1)-104(N)(D) for memory access requests. For example, processor 102(1) has a memory system 112(1) that includes a private local cache memory 113(1)(1) for CPU 104(1)(1), which may be a Level 2 (L2) cache memory, for example. If a memory read request requested by CPU 104(1)(1) results in a cache miss to the private local cache memory 113(1)(1), then the memory read request is forwarded by an internal interconnect bus 114(1) to a local shared cache memory 116(1)(1)-116(1)(X) as part of the memory system 112(1) in the processor 102(1), where 'X' represents a positive whole number of the number of shared cache memories. The internal interconnect bus 114(1), which may be a coherent bus, that is provided allows each of the CPUs 104(1)(1)-104(1)(C) in the processor 102(1) to access the local shared cache memories 116(l)(1)-116(1)(X) and other shared resources coupled to the interconnect bus 114(1). If a memory read request requested by a CPU 104(1)(1)-104(1)(C) results in a cache miss to the local shared cache memory 116(1)(1)-116(1)(X), the memory read request is forwarded by the interconnect bus 114(1) to a next level shared cache memory 118(1) as part of the memory system 112(1) in the processor 102(1). The shared cache memory 118(1) may be a Level 3 (L3) cache memory as an example. If a memory read request requested by a CPU 104(1)(1)-104(1)(C) further results in a cache miss to the shared cache memory 118(1), the memory read request is forwarded by the interconnect bus 114(1) to a memory controller 120(1) that is communicatively coupled to a system memory 122 as a main memory in the processor-based system 100. In this example, the system memory 122 is located off die from the processors 102(1)-102(N). For example, the system memory 122 may be a dynamic random access memory (DRAM) provided in a separate DRAM chip. Alternatively, the system memory 122 may be located on die with processors 102(1)-102(N). The processor 102(N) also includes a memory system 112(N) that includes the same memory components described above for the processor 102(1). This memory access hierarchy to these memory components in the memory systems 112(1)-112(N) in each processor 102(1)-102(N) form respective memory access paths 124(1)-124(N) in each processor 102(1)-102(N).

With continuing reference to FIG. 1, the processor-based system 100 in this example also includes a processor bus 125 coupled to the interconnect buses 114(1)-114(N) of each processor 102(1)-102(N), with a transport interface circuit 126 coupled thereto, to facilitate inter-processor communications between the processors 102(1)-102(N). The processor bus 125 can carry communications between the processors 102(1)-102(N). For example, a requesting CPU 104(1)(1)-104(1)(C) in the processor 102(1) may issue a memory read or write request to another processor 102(N) to read data from or write data to its respective memory system 112(N). In this regard, the transport interface circuit 126 is communicatively coupled to the interconnect buses 114(1)-114(N) of each processor 102(1)-102(N) through the processor bus 125, and is configured to receive such memory access requests destined from one processor 102(1)-102(N) to another processor 102(1)-102(N). For example, the transport interface circuit 126 may have 'N' incoming request queues 128i(1)-128i(N) corresponding to each processor 102(1)-102(N) to temporarily store requests, including memory access requests that are to be communicated from one processor 102(1)-102(N) to another processor 102(1)-102(N) in case there are more pending transfer requests at a given time than the transport interface circuit 126 can process at the same time. In another example, the incoming request queues 128i(1)-128i(N) may be common and/or shared between the processors 102(1)-102(N). The transport interface circuit 126 may also have 'N' outgoing request queues 128o(1)-128o(N) where requests that have been processed by the transport interface circuit 126 to be forwarded from one processor 102(1)-102(N) to another processor 102(1)-102(N) are stored until the recipient processor 102(1)-102(N) is ready to receive or "grab" the request. In another example, the outgoing request queues 128o(1)-128o(N) may be common and/or shared between the processors 102(1)-102(N).

Because the memory systems 112(1)-12(N) in the processors 102(1)-102(N) include shared memory components (e.g., the local shared cache memories 116(1)(1)-116(1)(X), 116(N)(1)-116(N)(X), shared cache memories 118(1)-118(N), system memory 122), the respective CPUs 104(1)(1)-104(1)(C), 104(N)(1)-104(N)(D) in the processors 102(1)-102(N) compete for access to these shared memory components when pending issued memory access requests are present at the same time in the respective memory access paths 124(1)-124(N). For example, the processor bus 125 and/or the interconnect buses 114(1)-14(N) may include arbiter circuits that arbitrate requests, including memory access requests, based on priorities and other criteria for access to resources in the processor-based system 100. Because the memory components in the memory systems 112(1)-112(N) are finite devices with finite circuits, each memory component has a certain processing speed or bandwidth to service memory requests, and thus these memory components are bandwidth constrained components. The bandwidth of these memory components and the number of pending memory access requests being processed at a given time affect the memory access speeds and memory performance of the processors 102(1)-102(N).

In this regard, with continued reference to FIG. 1, to conserve access bandwidth and improve performance in the processor-based system 100, the memory read honor circuits 110(1)-110(H) in the processor-based system 100 are communicatively coupled to one or more memory access path(s) 124(1)-124(N) in the memory systems 112(1)-112(N). For example, as shown in FIG. 1, the memory read honor circuit 110(1) is provided in the local shared cache memory 116(1)(1) that is part of a memory access path 124(1) in the processor 102(1). As another example, the memory read honor circuit 110(3) is provided in the memory controller 120(1) that is also part of the memory access path 124(1) in the processor 102(1). The memory read honor circuit 110(2) is provided in the transport interface circuit 126 that is part of the memory access path 124(2) between the processors 102(1), 102(N). The memory read honor circuits 110(1)-110(H) are configured to intercept a memory read request issued by the requesting CPU 104(1)(1)-104(1)(C), 104(N)(1)-104(N)(D) from respective memory access path 124(1)-124(N). The CPUs 104(1)(1)-104(1)(C), 104(N)(1)-104(N)(D) are configured to issue memory read requests that include a memory address indicating an address of requested data in the system memory 122 and a request mode for the requested data.

As discussed above, even though the memory read request by a requesting CPU 104(1)(1)-104(1)(C), 104(N)(1)-104(N)(D) in a respective processor 102(1)-102(N) is to a memory address of an address in the system memory 122, the data for the specified memory address may be present in a cache memory, such as the private local cache memory 113(1)(1), 113(N)(1), the local shared cache memory 116(1)(1)-116(1)(X), 116(N)(1)-116(N)(X), or the shared cache memory 118(1)-118(N). The request mode included in the memory read request in this example is either a "required" state or a "preferred" state, meaning not required. A preferred state request mode means that the memory read operation is determined by the requesting CPU 104(1)(1)-104(1)(C), 104(N)(1)-104(N)(D) to not be required. For example, preferred data may be data that the requesting CPU 104(1)(1)-104(1)(C), 104(N)(1)-104(N)(D) is speculated to use based on historical tracking of data needed after certain instructions are executed, based on assumptions of spatial locality. For example, speculative fetches or prefetches of data may be deemed preferred as not being known to be required to execute an instruction, as opposed to being required. Required data is data that a requesting CPU 104(1)(1)-104(1)(C), 104(N)(1)-104(N)(D) deems certain or required to use to execute an instruction (e.g., to produce a value to be consumed by another instruction).

Figure 2:
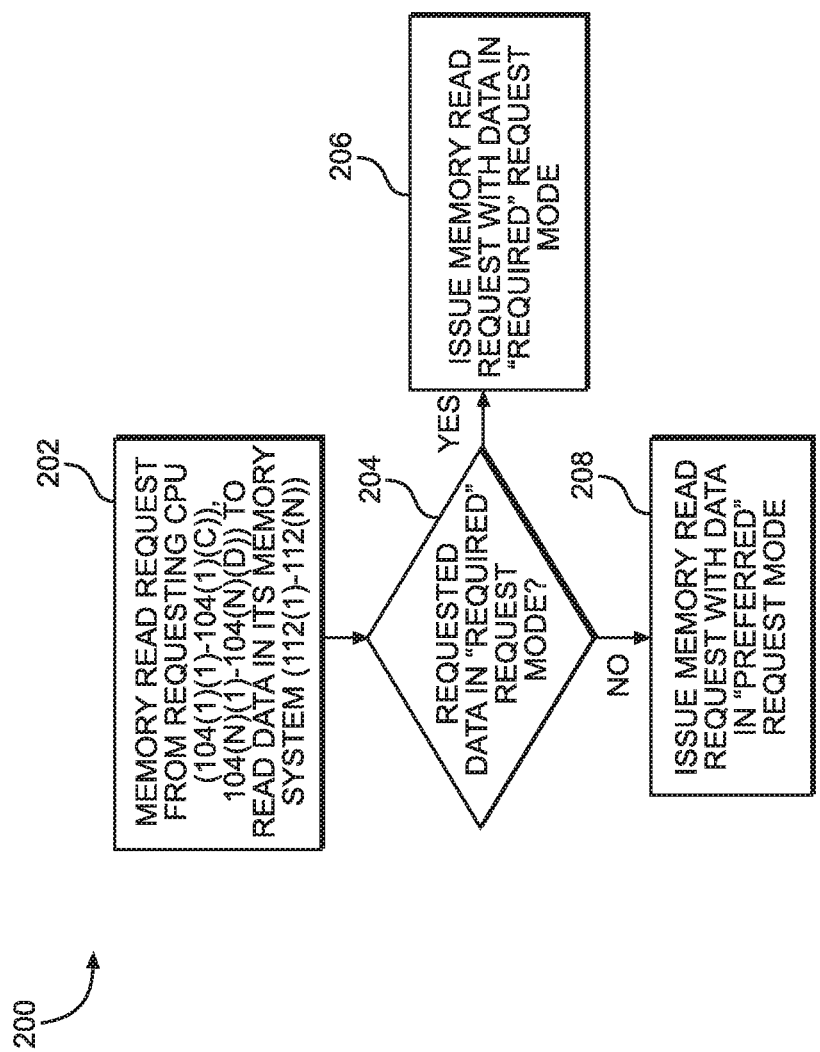
FIG. 2 is a flowchart illustrating an exemplary process of a requesting CPU in the processor-based system in FIG. 1 determining a request mode for data to be requested and including the request mode for the requested data to be issued in a memory access request.

FIG. 2 is a flowchart illustrating an exemplary process 200 of a requesting CPU 104(1)(1)-104(1)(C), 104(N)(1)-104(N)(D) in the processor-based system 100 in FIG. 1 determining a request mode for data to be requested and including the request mode for the requested data to be issued in a memory access request. The process 200 in FIG. 2 will be described in reference to the processor-based system 100 in FIG. 1. In this regard, as illustrated in FIG. 2, requesting CPU 104(1)(1)-104(1)(C), 104(N)(1)-104(N)(D) in a processor 102(1)-102(N) creates a memory read request to request read data in the memory system 112(1)-112(N) (block 202 in FIG. 2). The requesting CPU 104(1)(1)-104(1)(C), 104(N)(1)-104(N)(D) determines if the requested data is required (block 204 in FIG. 2). If the requested data is required, then the requesting CPU 104(1)(1)-104(1)(C), 104(N)(1)-104(N)(D) issues the memory read request with the requested data having the request mode of a required request state (block 206 in FIG. 2). However, if the requested data is preferred, then the requesting CPU 104(1)(1)-104(1)(C), 104(N)(1)-104(N)(D) issues the memory read request with the requested data having a request mode of a preferred request state (block 208 in FIG. 2). The memory read request will be issued in a memory access path 124(1)-124(N) in its respective processor 102(1)-102(N) to be fulfilled by a memory in its respective memory system 112(1)-112(N) according to the memory hierarchy as discussed above.

Figure 3:
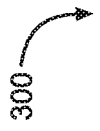
FIG. 3 is a table illustrating exemplary memory request sizes and requests modes determined by a requesting CPU in the processor-based system in FIG. 1 for a memory read request, and corresponding memory access requests including the request size and request mode for the memory read request.

This is shown by example in the table 300 in FIG. 3, which illustrates exemplary requests modes for a memory read request and an associated command issued by a requesting CPU 104(1)(1)-104(1)(C), 104(N)(1)-104(N)(D). As shown therein, for a required request mode, a requesting CPU 104(1)(1)-104(1)(C), 104(N)(1)-104(N)(D) would issue a memory read command having a request mode indicating a required request state. For a preferred request mode, a requesting CPU 104(1)(1)-104(1)(C), 104(N)(1)-104(N)(D) would issue a memory read command having a request mode indicating preferred request state.

Figure 4:
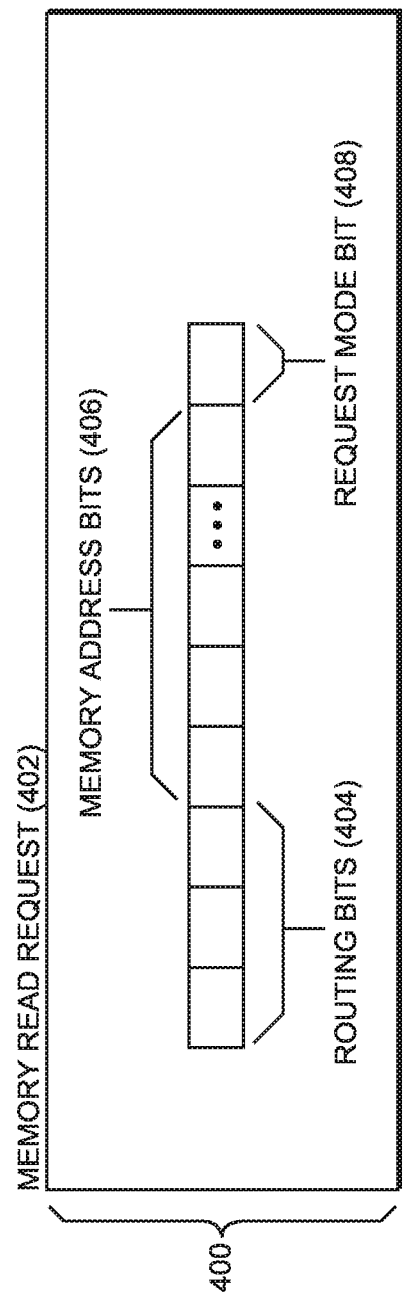
FIG. 4 is a diagram of an exemplary bit format for a memory read request that can be issued by a CPU in processor-based system in FIG. 1 and that includes a request size and request mode for requested data.

FIG. 4 is a diagram of an exemplary bit format 400 for an exemplary memory read request 402 that can be issued by a requesting CPU **104(1)(*l*)-104(1)(C), 104(N)(1)-104(N)(D) in the processor-based system 100 in FIG. 1 based on the determined request mode for the requested data to be read. As shown in FIG. 4, the memory read request 402 includes routing bits 404 that provide routing information on how the memory read request 402 is to be addressed in a memory component in the memory system 112(1)-112(N). In this example, three (3) routing bits 404 are provided for a possibility of eight (8) routing possibilities. For example, the routing bits 404 may represent a cache "way" for an associative cache memory. The memory read request 402 also includes memory address bits 406 that indicate the address of the location of the data to be read in the memory system 112(1)-112(N). In this example, the memory address bits 406 can be any number of bits desired based on the memory line size of the memory system 112(1)-112(N) and can be used in conjunction with the routing bits 404 to fully address a memory location in the memory system 112(1)-112(N) for the memory read request 402. In this example, the memory read request 402 also includes a request mode bit 408 that is encoded to indicate if the requested data in the memory read request 402 has a request mode indicating a required request state or preferred request state. For example, a '0' value in the request mode bit 408 may be used to indicate a preferred request state, whereas a '1' value in the request mode bit 408** may be used to indicate a required request state.

With reference back to FIG. 1, the memory read honor circuits 110(1)-110(H) are configured to determine the request mode for the requested data in a received (i.e., intercepted) memory read request issued by a requesting CPU 104(1)(1)-104(1)(C), 104(N)(1)-104(N)(D) and determine if requested data having a preferred request mode in the memory read request will be fulfilled based on a bandwidth state of the memory system 112(1)-112(N). In this example, the determined bandwidth state of the memory system 112(1)-112(N) is the bandwidth state of a memory component in which the memory read honor circuit 110(1)-110(H) is associated with. For example, if the memory read honor circuit 110(1)-110(H) is associated with or included in a local shared cache memory 116(1)(1)-116(1)(X), 116(N)(1)-116(N)(X), then the memory read honor circuit 110(1)-110(H) can be configured to determine the bandwidth state of the local shared cache memory 116(1)(1)-116(1)(X), 116(N)(1)-116(X) to determine whether to fulfill data requests having a request mode of a preferred request state in an intercepted memory access request. As another example, if the memory read honor circuit 110(1)-110(H) is associated with or included in a memory controller 120(1)-120(N), then the memory read honor circuit 110(1)-110(H) can be configured to determine the bandwidth state of the memory controller 120(1)-120(N) to determine whether to fulfill data requests having a request mode of a preferred request state in an intercepted memory access request.

Figure 5:
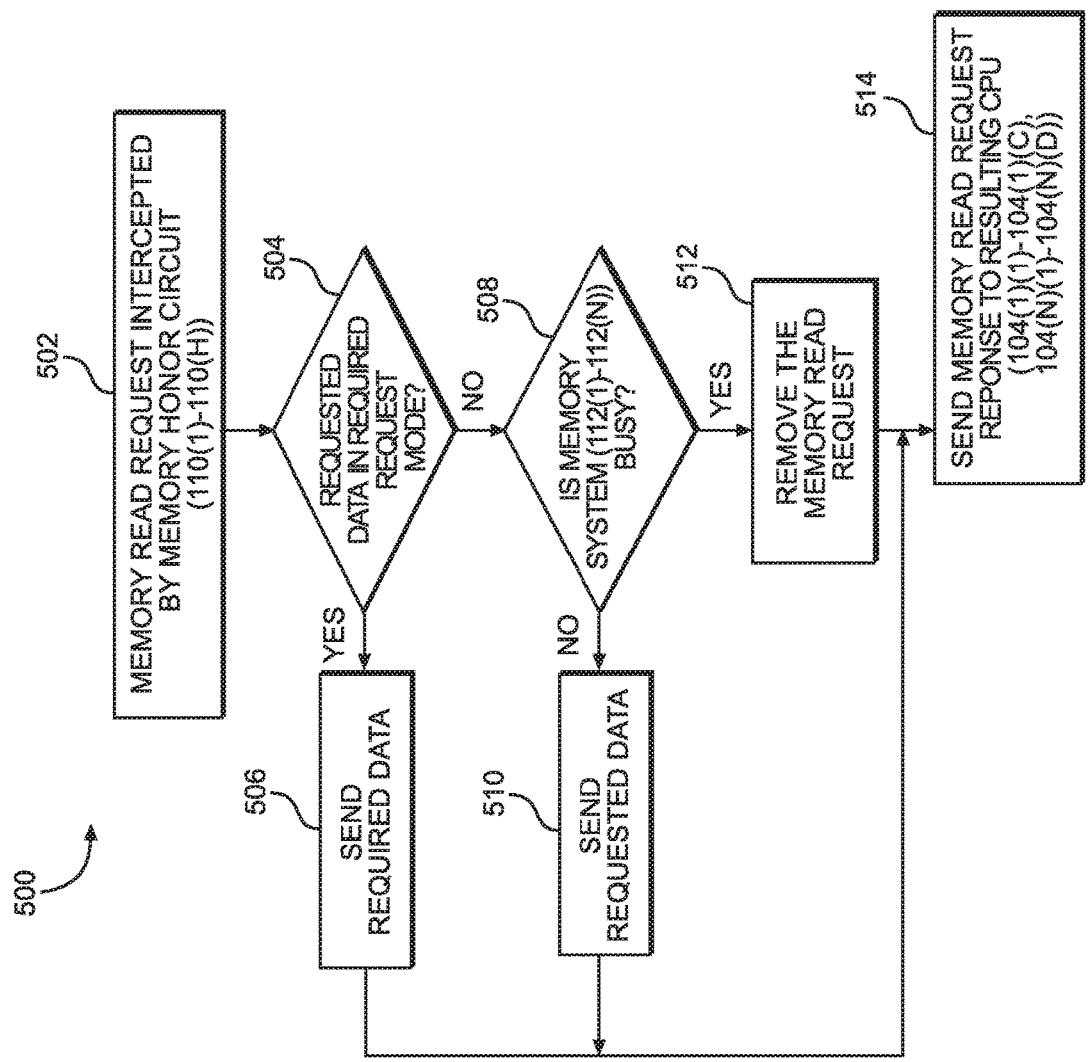
FIG. 5 is a flowchart illustrating an exemplary process of a memory read honor circuit in a cache memory or memory controller in the processor-based system in FIG. 1 configured to receive a memory read request issued by a requesting CPU according to the process in FIG. 2, and determine if the requested preferred data in the memory read request is to be forwarded based on a determined bandwidth in the memory system.

This is illustrated by example in the process 500 in FIG. 5. As illustrated in FIG. 5, this process 500 starts when a memory read honor circuit 110(1)-110(H) coupled to a memory access path 124(1)-124(N) receives a memory read request issued by a requesting CPU 104(1)(1)-104(1)(C), 104(N)(1)-104(N)(D) in its respective processor 102(1)-102(N) (block 502). The memory read honor circuits 110(1)-110(H) can intercept memory read requests if not fulfilled by a memory component in higher level portion memory access paths 124(1)-124(N) closer to the requesting CPU 104(1)(1)-104(1)(C), 104(N)(1)-104(N)(D). As discussed above, the processors 102(1)-102(N) can include memory read honor circuits 110(1)-110(H) in different memory components at different hierarchical levels in their respective memory systems 112(1)-112(N). The memory read honor circuit 110(1)-110(H) determines the request mode for the requested data in the intercepted memory read request (block 504 in FIG. 5). If the request mode for the requested data in the received memory read request has a request mode indicating a required request state, then the memory read honor circuit 110(1)-110(H) forwards the memory read request in its received memory access path 124(1)-124(N) to continue towards a memory component in a memory system 112(1)-112(N) to be fulfilled (block 506 in FIG. 5).

Figure 6:
FIG. 6 is a table illustrating exemplary data sizes for the received memory read requests that can be forwarded by a memory read honor circuit in the processor-based system in FIG. 1 based on a determined bandwidth in the memory system.

Thus, for example, as shown in the table 600 in FIG. 6, for an example memory line size of 128 bytes in the memory systems 112(1)-112(N), the memory read honor circuit 110(1)-110(H) is configured to forward a memory read request for 128 bytes of data if the request mode is in a required request state for the memory read request irrespective of the bandwidth state of the respective memory system 112(1)-112(N). However, if the request mode for the requested data in the received memory read request has a request mode indicating a preferred request state, then this means that the requested data is not required by the requesting CPU 104(1)(1)-104(1)(C), 104(N)(1)-104(N)(D) to execute an instruction. Thus, it may be desired to determine the bandwidth state in the memory system 112(1)-112(N) first before forwarding the memory read request to determine if bandwidth is in a constrained state. The bandwidth of the memory system 112(1)-112(N) being in a constrained state may affect the performance of other memory accesses in the memory system 112(1)-112(N), and thus affect the processor 102(1)-102(N) performance. For example, if one memory read request having a required mode is competing for access to the same memory access path 124(1)-124(N) and/or memory component in a memory system 112(1)-112(N) as another memory read request having a preferred mode, then fulfilling the memory read request having the preferred mode can affect memory access time of the memory read request having a required mode. Note that the example bytes returned for a given request mode shown in table 600 in FIG. 6 is only an example, and is not limiting to the processor-based system 100 in FIG. 1, and that the processor-based system 100 can be designed to implement other/different data return policies for multi-sector memory read requests.

In this regard, with continuing reference to FIG. 1 and the process 500 in FIG. 5, the memory read honor circuit 110(1)-110(H) is configured to determine if the determined bandwidth state exceeds a defined bandwidth constraint threshold of the respective memory system 112(1)-112(N) for the memory access request that includes requested data has a preferred request mode. For example, a determined bandwidth state below the defined bandwidth constraint threshold may be deemed a "not busy" bandwidth state, whereas a determined bandwidth state above or exceeding the defined bandwidth constraint threshold may be deemed a "busy" bandwidth state. This is shown in the table 600 in FIG. 6 illustrating a data size for a received memory read request that is either forwarded (e.g., shown as 128 bytes) or not forwarded (e.g., shown as 0 bytes) by a memory read honor circuit 110(1)-110(H) based on a determined bandwidth in the memory system 112(1)-12(N). The bandwidth state may be determined, for example, by checking the queue size in a memory access path 124(1)-124(N) and/or memory component in a memory system 112(1)-112(N).

With reference back to FIG. 5, if the determined bandwidth state for the particular memory system 112(1)-112(N) of the recipient processor 102(1)-102(N) does not exceed the defined bandwidth constraint threshold (e.g., "not busy" in FIG. 6), the memory read honor circuit 110(1)-110(H) forwards the memory read request in the memory system 112(1)-112(N) (block 510 in FIG. 5). This is because it was determined based on the defined bandwidth constraint threshold that performance would not be affected in an undesired manner by fulfilling the memory read request for the requested data having a request mode of a preferred request state based on the determined bandwidth state. However, if the determined bandwidth state does exceed the defined bandwidth constraint threshold (e.g., "busy" in FIG. 6) for the particular memory system 112(1)-112(N) of the recipient processor 102(1)-102(N), then the memory read honor circuit 110(1)-110(H) removes the memory read request from the memory access path 124(1)-124(N) in the memory system 112(1)-112(N) (block 512 in FIG. 5). As one example, the memory read honor circuit 110(1)-110(H) may be configured to remove the memory read request by not forwarding the intercepted memory read request in the memory access path 124(1)-124(N) in the memory system 112(1)-112(N) in which it was intercepted. In another example, the memory read honor circuit 110(1)-110(H) may be configured to remove the memory address of the requested data in the memory read request.

Figure 7:
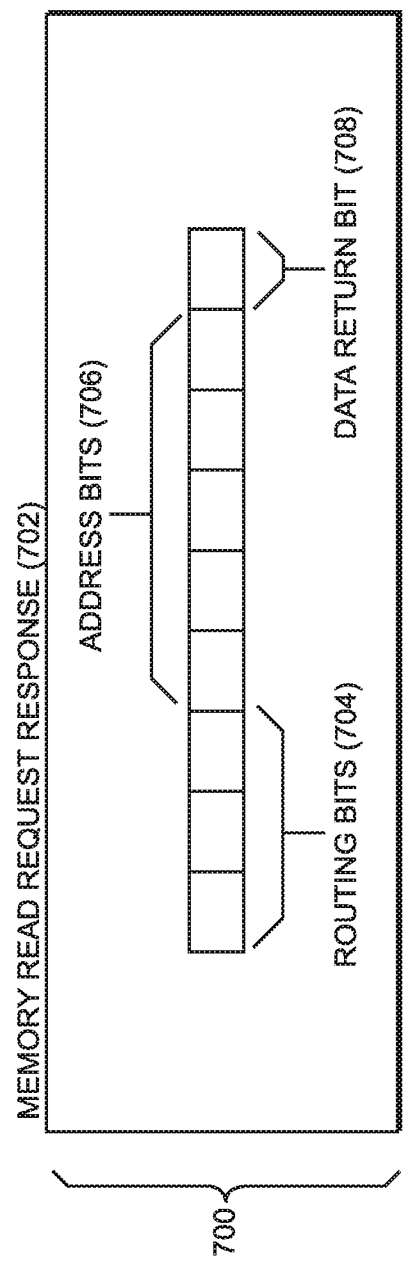
FIG. 7 is a diagram of an exemplary bit format memory read request that can be issued by a memory read honor circuit in the processor-based system in FIG. 1 to a requesting CPU in response to intercepting and processing a memory read request from the requesting CPU.

Regardless of whether the requested data in a received memory access request has a required or preferred request mode, the memory read honor circuit 110(1)-110(H) sends a memory read request response to the requesting CPU 104(1)(1)-104(1)(C), 104(N)(1)-104(N)(D) indicating the forward status of the memory access request (block 514 in FIG. 5). For example, FIG. 7 is a diagram of an exemplary bit format 700 of a memory read request response 702 that can be issued by a memory read honor circuit 110(1)-110(H) in processor-based system 100 in FIG. 1 to a requesting CPU 104(1)(1)-104(1)(C), 104(N)(1)-104(N)(D) in response to intercepting and processing a memory read request from the requesting CPU 104(1)(1)-104(1)(C), 104(N)(1)-104(N) (D). As shown in FIG. 7, the memory read request response 702 includes routing bits 704 that provide routing information based on the original memory read request to be addressed in a memory component in the memory system 112(1)-112(N). The memory read request response 702 also includes memory address bits 706 that indicate the address of the location of the data to be read in the memory access request. These bits are used to identify the memory access request that a response is associated with since the requesting CPU 104(1)(1)-104(1)(C), 104(N)(1)-104(N)(D) may have multiple outstanding memory access requests. In this example, the memory read request response 702 also includes a data return bit 708 that is encoded with a data return state to indicate if the requested data in memory read request 402 was forwarded such that the requesting CPU 104(1)(1)-104(1)(C), 104(N)(1)-104(N)(D) can expect to receive the requested data for the previously issued associated memory access request.

For example, a '0' value in the data return bit 708 may indicate a data return of a data return state, meaning the memory access request was forwarded and the requested data will be returned in response to the issued associated memory access request. As another example, a '1' value in the data return bit 708 may indicate a data return of a no data return state, meaning the requested data for the issued associated memory access request will not be returned. The requesting CPU 104(1)(1)-104(1)(C), 104(N)(1)-104(N)(D) can determine whether to reissue a memory access request that was not fulfilled. For example, the requesting CPU 104(1)(1)-104(1)(C), 104(N)(1)-104(N)(D) may reissue, at later time, a memory access request for requested data that was not fulfilled, as either having a request mode of another preferred request state or by changing the request mode to a required request state depending on its operational design.

As illustrated in FIG. 1 and previously discussed, the processor-based system 100 also supports communication of memory read requests from one processor 102(1)-102(N) to another processor 102(1)-102(N) through the transport interface circuit 126. However, using the processor 102(1) as an example, when one of its requesting CPUs 104(1)(1)-104 (1)(C) issues a memory read request that is destined for another processor, such as processor 102(N) for example, the destination processor 102(N) may be in a bandwidth constrained state. However, memory read honor circuits 110(1), 110(3) in the processor 102(1) may not be able to determine the bandwidth state of the separate processor 102(N). Thus, in another example, as discussed above, the memory read honor circuit 110(2) is included or associated with the transport interface circuit 126 in the processor-based system in FIG. 1 so that a memory access request with request mode of a preferred request state can be selectively fulfilled by the recipient processor 102(N) based on its bandwidth state. This is illustrated by example in the process 800 in FIG. 8.

Figure 8:
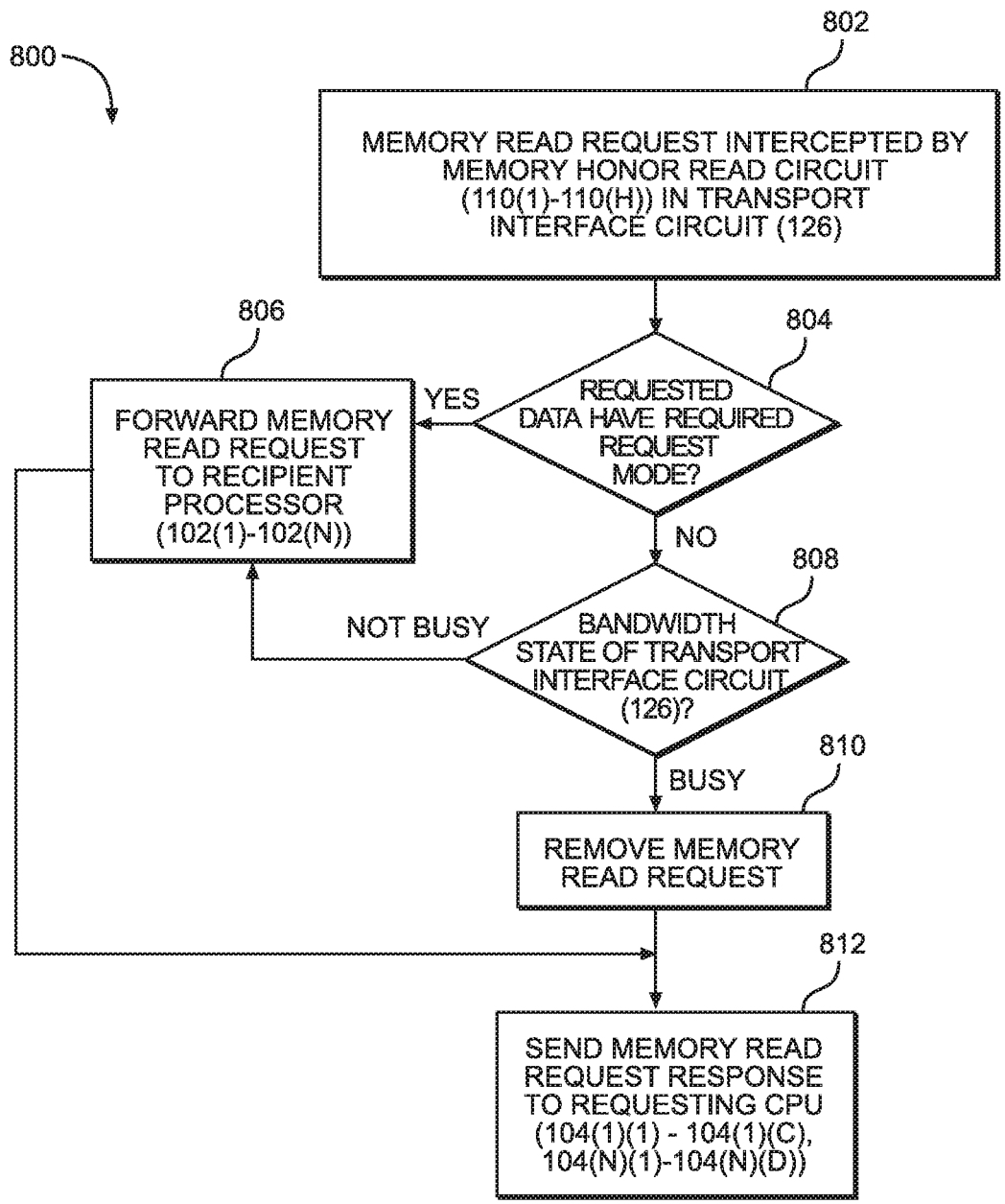
FIG. 8 is a flowchart illustrating an exemplary process of a memory read honor circuit in a transport interface circuit in the processor-based system in FIG. 1 configured to receive a memory read request issued by a requesting CPU according to the process in FIG. 2, and determine if the requested preferred data in the memory read request is to be forwarded based on a determined bandwidth in the memory system.

As illustrated in FIG. 8, the memory read honor circuit 110(2) coupled to the transport interface circuit 126 in the processor-based system 100 in FIG. 1 can be configured to intercept a memory read request issued by a requesting CPU 104(1)(1)-104(1)(C), 104(N)(1)-104(N)(D) destined to a different processor 102(1)-102(N) (block 802). The memory read honor circuit 110(2) can intercept memory read requests communicated between processors 102(1)-102(N) if not fulfilled by a memory component in the memory system 112(1)-112(N) of the processor 102(1)-102(N) of the requesting CPU 104(1)(1)-104(1)(C), 104(N)(1)-104(N) (D). The memory read honor circuit 110(2) determines the request mode for the requested data in the intercepted memory read request (block 804 in FIG. 8). If the request mode for the requested data in the received memory read request has a request mode indicating a required request state, then the memory read honor circuit 110(2) forwards the memory read request in its received memory access path 124(1)-124(N) to continue towards the recipient processor 102(1)-102(N) to be fulfilled (block 806 in FIG. 8). However, if the request mode for the requested data in the intercepted memory read request by the memory read honor circuit 110(2) has a request mode indicating a preferred request state, then this means that the requested data is not required by the requesting CPU 104(1)(1)-104(1)(C), 104 (N)(1)-104(N)(D) to execute an instruction. Thus, it may be desired to determine the bandwidth state in the recipient processor 102(1)-102(N) first before forwarding the memory read request to determine if bandwidth state of the recipient processor 102(1)-102(N) is in a constrained state that thus may affect its performance in an undesired manner.

In this regard, with continuing reference to FIG. 8, the memory read honor circuit 110(2) is configured to determine if the determined bandwidth state of the recipient processor 102(1)-102(N) exceeds a defined bandwidth constraint threshold for the memory access request that includes requested data having a preferred request mode. For example, a determined bandwidth state below the defined bandwidth constraint threshold may be deemed a "not busy" bandwidth state for the recipient processor 102(1)-102(N), whereas a determined bandwidth state above or exceeding the defined bandwidth constraint threshold may be deemed a "busy" bandwidth state in the recipient processor 102(1)-102(N). In this example, the bandwidth state of the respective recipient processor 102(1)-102(N) may be determined, for example, by checking the queue size of its respective incoming request queues 128i(1)-128i(N) and/or its respective outgoing request queues 128o(1)-128o(N) in the transport interface circuit 126. In other examples, the bandwidth state of the respective recipient processor 102(1)-102(N) may be determined by checking the queue size of all respective incoming request queues 128i(1)-128i(N) and/or all respective outgoing request queues 128o(1)-128o(N) in the transport interface circuit 126, such as if such queues are shared for example.

With continuing reference to FIG. 8, if the determined bandwidth state does not exceed the defined bandwidth constraint threshold for the particular recipient processor 102(1)-102(N) (block 808), then the memory read honor circuit 110(2) forwards the memory read request to such particular recipient processor 102(1)-102(N) (block 806). This is because it was determined based on the defined bandwidth constraint threshold that performance of the recipient processor 102(1)-102(N) would not be affected in an undesired manner by fulfilling the memory read request for the requested data having a request mode of preferred request state based on the determined bandwidth state. However, if the determined bandwidth state does exceed the defined bandwidth constraint threshold for the particular recipient processor 102(1)-102(N) (block 808 in FIG. 8), then the memory read honor circuit 110(2) removes the memory read request from being communicated to such recipient processor 102(1)-102(N) (block 810 in FIG. 8). As one example, the memory read honor circuit 110(2) removes the memory read request by not forwarding the intercepted memory read request to the recipient processor 102(1)-102(N). In another example, the memory read honor circuit 110(2) removes the memory address of the requested data in the memory read request. Regardless of whether the requested data in a received memory access request has a required or preferred request mode, the memory read honor circuit 110(2) in this example sends a memory read request response to the requesting CPU 104(1)(1)-104(1)(C), 104(N)(1)-104(N)(D) indicating the forward status of the memory access request to the recipient processor 102(1)-102(N) (block 812 in FIG. 8). The format of the memory read request response may be as previously described in the memory read request response 702 in FIG. 7 as an example.

Figure 9:
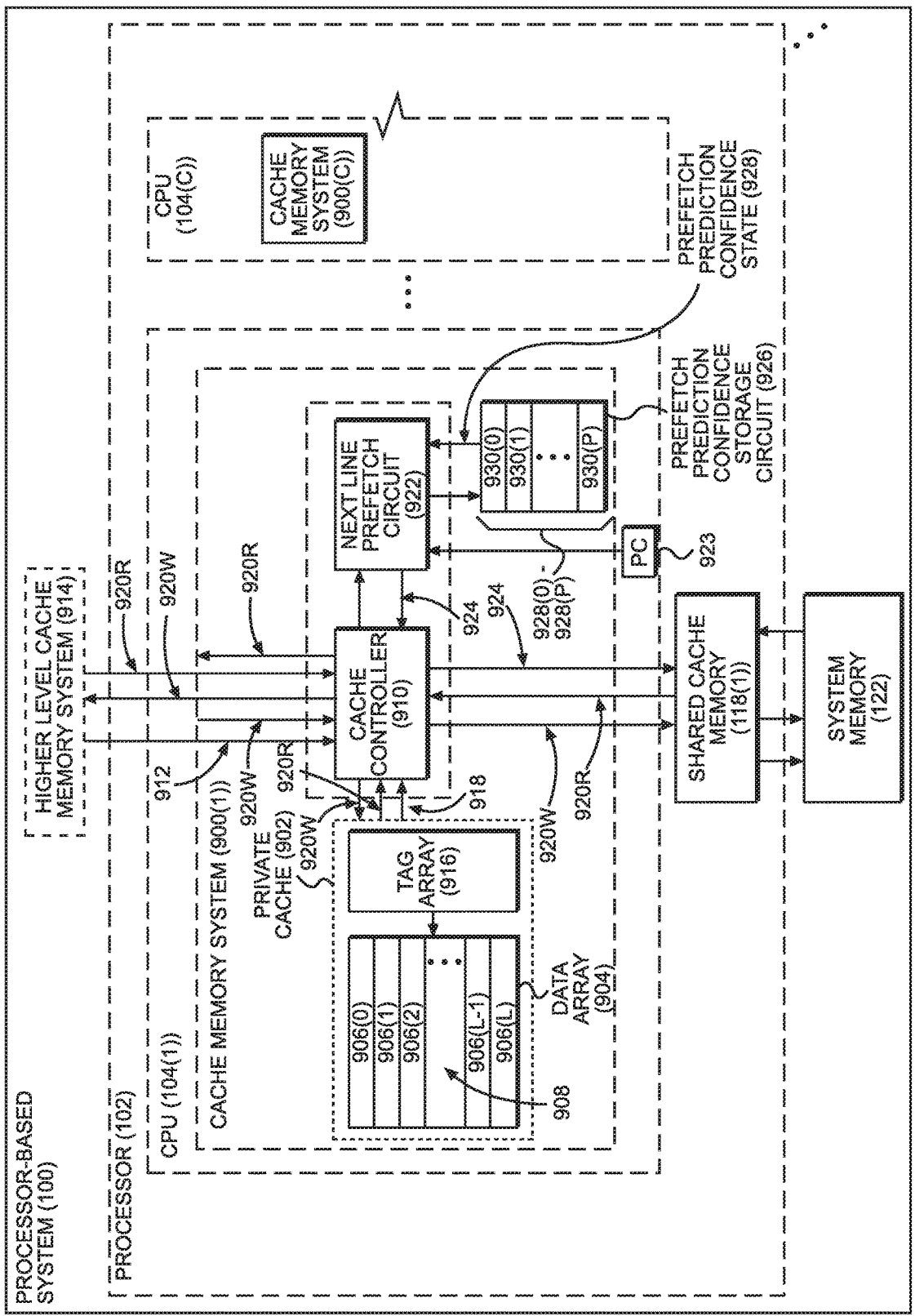
FIG. 9 is a schematic diagram of exemplary CPUs that can be included in the processors in the processor-based system in FIG. 1, and that includes a memory read operation circuit configured to determine and include the request size and request mode for requested data in a memory read request.

As discussed above, the requesting CPUs 104(1)(1)-104(1)(C), 104(N)(1)-104(N)(D) in the respective processors 102(1)-102(N) in the processor-based system 100 in FIG. 1 can be configured to issue memory read requests for speculative requested data. FIG. 9 is a schematic diagram of exemplary CPUs 104(1)-104(C) in processor 102 that can be included in any of the processors 102(1)-102(N) in the processor-based system 100 in FIG. 1 to illustrate exemplary memory systems and speculative prefetching circuits therein configured to support speculative prefetching. Each CPU 104(1)-104(C) includes a respective cache memory system 900(1)-900(C). The cache memory systems 900(1)-900(C) are configured to issue next line prefetch requests in this example in response to cache misses for data access to cache memory in response to memory load instructions. The cache memory systems 900(1)-900(C) are configured to throttle next line prefetching based on a prefetch prediction confidence state. For simplicity purposes only, only the cache memory system 900(1) in the CPU 104(1) illustrated in FIG. 9 is discussed below. However, note that the details of the cache memory system 900(1) in the CPU 104(1) are also applicable to the cache memory systems 900(2)-900(C) in the other respective CPUs 104(2)-104(C).

In this regard, with reference to FIG. 9 and using cache memory system 900(1) as an example, the cache memory system 900(1) includes an internal private cache memory 902. Note that other internal components of the processor 102 in FIG. 9, including the instruction processing system pipeline and other circuits to issue memory read and write data requests, are not shown. The private cache memory 902 includes a data array 904 that includes a plurality of cache entries 906(0)-906(L) (also referred to as "cache lines 906(0)-906(L)") each configured to store cache data 908. A cache controller 910 is also provided in the cache memory system 900(1). The cache controller 910 is configured to receive a memory load (i.e., read) instruction 912 directly or indirectly from the CPU 104(1). For example, the cache memory system 900(1) may be a level zero (L0) or level one (L1) cache that is directly or indirectly accessed by the CPU 104(1). The cache memory system 900(1) may include the shared cache memory 118(1) as a shared cache memory. The cache memory system 900(1) may include a higher level cache memory system 914 that is external to the processor 102 acting as a level three (L3) cache. The memory load instruction 912 includes a memory read address to be accessed to retrieve data for execution of the memory load instruction 912.

In response to receiving the memory load instruction 912, the cache controller 910 indexes a tag array 916 in the private cache memory 902 using the memory read address in the memory load instruction 912. If the tag indexed by the memory read address of the memory load instruction 912 in the tag array 916 matches the memory read address in the memory load instruction 912, and the tag is valid, then a cache hit occurs. This means that the cache data 908 corresponding to the memory read address of the memory load instruction 912 is contained in the cache entry 906(0)-906(L) associated with the indexed tag in the data array 904. In response, the private cache memory 902 generates a cache hit/miss indicator 918 indicating a cache hit to the cache controller 910. The cache data 908 corresponding to the indexed tag is provided directly or indirectly as read cache data 920R to the CPU 104(1). If the tag indexed by the memory read address of the memory load instruction 912 in the tag array 916 does not match the memory read address in the memory load instruction 912 or if the tag is invalid, then a cache miss occurs. In response, the private cache memory 902 generates the cache hit/miss indicator 918 indicating a cache miss.

The cache controller 910 is also configured to fill write cache data 920W into the data array 904 as the cache data 908 in response to a memory write operation issued by the CPU 104(1) to write data to memory. The write cache data 920W is stored in a cache entry 906(0)-906(L) in the data array 904 based on the memory read address of the memory write operation. In this manner, the CPU 104(1) can later access the cache data 908 stored in the data array 904 in response to the memory load instruction 912 as opposed to having to obtain the cache data 908 from a higher level memory, such as the shared cache memory 118(1). Thus, the private cache memory 902 in this example is a lower level cache memory to the shared cache memory 118(1). Other memory systems, such as the system memory 122, may also exist at a higher level. The cache controller 910 is also configured to write back the write cache data 920W to the shared cache memory 118(1).

With continuing reference to FIG. 9, the cache memory system 900(1) includes a next line prefetch circuit 922 configured to issue next line prefetches in response to the memory load instructions 912 being processed by the CPU 104(1). The next line prefetch circuit 922 is configured to predict whether a next memory address following a memory read address of the memory load instruction 912 will be accessed in the near future for memory read operations. The prediction may be based on the current program counter (PC) 923 of the instruction being executed. Using these predictions, the next line prefetch circuit 922 is configured to make next line prefetch requests to the shared cache memory 118(1) to speculatively preload cache lines 906(0)-906(L) at the next memory address(es). Thus, data stored at the next memory address(es) is brought into the shared cache memory 118(1) and private cache memory 902 before it is actually demanded. Thus, correct predictions of next memory addresses by the next line prefetch circuit 922 can reduce the number of cycles a load stalls in the CPU 104(1) waiting for data needed to execute the memory load instruction 912.

In this regard, the next line prefetch circuit 922 is configured to receive the memory load instruction 912 processed by the CPU 104(1). The memory load instruction 912 includes a memory read address and the request mode (e.g., required or preferred) to be accessed to retrieve data for execution of the memory load instruction 912. The cache controller 910 determines if valid data for the memory read address is stored in the private cache memory 902 as read cache data 920R. The cache controller 910 generates the cache hit/miss indicator 918 indicating if the valid data for the memory read address is stored in the private cache memory 902 as read cache data 920R. The next line prefetch circuit 922 is configured to receive the cache hit/miss indicator 918 from the cache controller 910 indicating if read cache data 920R for the memory read address of the memory load instruction 912 is contained in the private cache memory 902. If the cache hit/miss indicator 918 indicates a cache hit, then the next line prefetch circuit 922 does not issue a next line prefetch request in this example, because a next line prefetch request 924 would replace read cache data 920R in a cache entry 906(0)-906(L) in the private cache memory 902 that may be more useful than the prefetched data. However, if the cache hit/miss indicator 918 indicates a cache miss, in this example, then the next line prefetch circuit 922 is configured to issue a next line prefetch request 924. In this example, the next line prefetch request 924 is forwarded by the cache controller 910 to the shared cache memory 118(1) to prefetch the data at the next memory address(es).

In this example, the next line prefetch request 924 may be an instruction for the shared cache memory 118(1) to prefetch data for a next sequential memory address or line following the memory read address of the memory load instruction 912 making an assumption about spatial locality of memory addresses read for instructions to be executed in the near future. Alternatively, the next line prefetch request 924 may also be an instruction for the shared cache memory 118(1) to prefetch data at another, next memory read address or addresses following the memory read address of the memory load instruction 912. However, the next line prefetch circuit 922 could be configured to issue the next line prefetch request 924 to the shared cache memory 118(1) without such request being provided to the cache controller 910. The shared cache memory 118(1) will process the next line prefetch request 924. The cache controller 910 is configured to determine whether the requested data in the next line prefetch request 924 is required or preferred.

With continuing reference to FIG. 9, in this example, before the next line prefetch circuit 922 issues the next line prefetch request 924 in response to a cache miss for the memory load instruction 912, the next line prefetch circuit 922 is configured to predict the usefulness of the next line prefetch request 924. In this example, the usefulness of prefetched data is based on a likelihood that the prefetched data at the next memory address(es) will be accessed for a memory load operation sooner or more often that the evicted cache data 908, and replaced with the next line prefetched data. If prefetched data at the next memory address(es) is not accessed in the near future for memory load operations, then other cache data 908 in the private cache memory 902 may be evicted and replaced that may have otherwise been accessed in response to the memory load operation.

In this regard, the next line prefetch circuit 922 in FIG. 9 is configured to access a prefetch prediction confidence storage circuit 926 to obtain a prefetch prediction confidence state 928 associated with the memory load instruction 912 for making a prefetch prediction. The prefetch prediction confidence storage circuit 926 contains one or more next line prefetch prediction confidence indicators 930(0)-930(P) that can be indexed based on the memory load instruction 912. For example, the prefetch prediction confidence storage circuit 926 may be indexed based on a subset of bits of a program counter (PC) 923 and/or a hash of the PC 923 of the memory load instruction 912. The next line prefetch prediction confidence indicators 930(0)-930(P) are each configured to store a prefetch prediction confidence state 928(0)-928(P) indicating either a next line prefetch state or a no next line prefetch state. The prefetch prediction confidence storage circuit 926 is indexed based on the memory load instruction 912 to access a next line prefetch prediction confidence indicator 930(0)-930(P). If the respective prefetch prediction confidence state 928(0)-928(P) of the next line prefetch prediction confidence indicator 930(0)-930(P) is a next line prefetch state, then the next line prefetch circuit 922 issues the next line prefetch request 924 in response to the cache miss. If the respective prefetch prediction confidence state 928(0)-928(P) of the indexed prefetch prediction confidence indicator 930(0)-930(P) is a no next line prefetch state, then the next line prefetch circuit 922 does not issue the next line prefetch request 924 in response to the cache miss.

The processor-based system 100 in FIG. 1 may be designed such that the memory line size in the respective memory system 112(1)-112(N) is larger than the sector size governing the data width of the processors 102(1)-102(N). A memory line width or size is also known as a cache line or memory block size. For example, if the memory line size in the memory system 112(1)-112(N) is 128 bytes, each memory line may consist of two 64 byte sectors, each storing a separate data word that can be accessed by the CPUs 104(1)(1)-104(1)(C), 104(N)(1)-104(N)(D). Thus, the processor-based system 100 in FIG. 1, if including multiple sectors per memory line, will fetch data from a memory read operation from the memory systems 112(1)-112(N) of the memory line size even if the processor 102(1)-102(N) is only requesting one sector of data. A CPU 104(1)(1)-104(1)(C), 104(N)(1)-104(N)(D) as a requesting CPU may specify a particular sector as containing the critical word for an operation. Thus, the data retrieved from the sector at a memory address in the memory system 112(1)-112(N) as part of a memory read operation that does not contain the critical word can be thought of as a speculative fetch of data. Thus, it may be desired to configure the CPUs 104(1)(1)-104(1)(C), 104(N)(1)-104(N)(D) to indicate whether the requested data in each sector of an addressed memory line as part of a memory read operation has a requesting mode indicating a required or preferred request state and to configure the memory read honor circuits 110(1)-110(H) to be selective when processing the requested data for multiple sectors intercepted in a memory read operation based on their individual request mode states.

Figure 10:
FIG. 10 is a table illustrating exemplary memory request sizes and requests modes determined by a requesting CPU in the processor-based system in FIG. 1 for a memory read request that includes multiple sectors, and corresponding memory access requests including the request size and request mode for each sector for the memory read request.

In this regard, FIG. 10 is a table 1000 illustrating exemplary memory request size and requests mode combinations for a memory system 112(1)-112(N) that includes multiple sectors per memory line. In this example, the sector width is 64 bytes and the memory line width is 128 bytes, thus providing two sectors Sector 1 and Sector 0 in each memory line. The table 1000 illustrates exemplary data transfer sizes that can be controlled by a memory read honor circuit 110(1)-110(H) based on the request size and request mode for each sector's memory read request. For example, in row 1002 of table 1000, for a memory read request having a request size of 64 bytes for Sector 0 having a request mode of a required request state, a memory read honor circuit 110(1)-110(H) that intercepts such memory read request will forward the memory read request such that 64 bytes from Sector 0 of the addressed memory line according to the memory address in the memory read request will be returned regardless of a determined bandwidth state. In the example table 1000, four (4) bandwidth states are provided as opposed to just two bandwidth states for greater granularity based on bandwidth constraints for selective control of fetching data from the memory system 112(1)-112(N). Similarly, in row 1004 of table 1000, for a memory read request having a request size of 64 bytes for Sector 1 having a request mode of a required request state, a memory read honor circuit 110(1)-110(H) will forward the memory read request such that 64 bytes from Sector 1 are returned regardless of a determined bandwidth state. Similarly, in row 1010 of table 1000, for a memory read request having a request size of 128 bytes for Sectors 1 and 0, both having a request mode of a required request state, a memory read honor circuit 110(1)-110(H) will forward the memory read request such that 64 bytes from each of Sectors 1 and 0 (total of 128 bytes) will be returned regardless of a determined bandwidth state.

With continuing reference to FIG. 10, if any data sector is requested having a request mode in a preferred request state, the memory read honor circuit 110(1)-110(H) is configured to selectively forward the requested sector in the memory read request based on the determined bandwidth state in the memory system 112(1)-112(N). For example, in row 1006 of table 1000, for memory read request having a request size of 64 bytes for Sector 0 and a request mode of a preferred request state, a memory read honor circuit 110(1)-110(H) will forward the memory read request such that 64 bytes from Sector 0 will be returned based on the determined bandwidth state. In this example, as shown in table 1000 in FIG. 10, the memory read honor circuit 110(1)-110(H) may be configured to not forward the memory read request if the determined bandwidth state is "high busy" or "medium busy" state, forward only the 64 bytes for the requested Sector 0 if the bandwidth state is "low busy," and forward both Sectors 1 and 0 of data of 128 bytes if the bandwidth date is "not busy." The four bandwidth states of "high busy," "medium busy," "low busy," and "not busy" are bandwidth states in order of most bandwidth constrained to least bandwidth constrained. The reason in this example that 128 bytes are returned even though a memory read request may only request one sector of 64 bytes having a request mode of a preferred request state is because it was determined that doing such would not affect memory access performance in an undesired manner since the bandwidth of the memory system 112(1)-112(N) was not constrained and available. The table 1000 also includes other rows 1008, 1012, 1014, and 1016 having examples of memory read requests wherein at least one requested sector has a request mode having a preferred request state. Note that the example bytes returned for a given request size and request mode shown in table 1000 in FIG. 10 is only an example, and is not limiting to the processor-based system 100 and that the processor-based system 100 can be designed to implement other/different data return policies for multi-sector memory read requests.

Figure 11A:
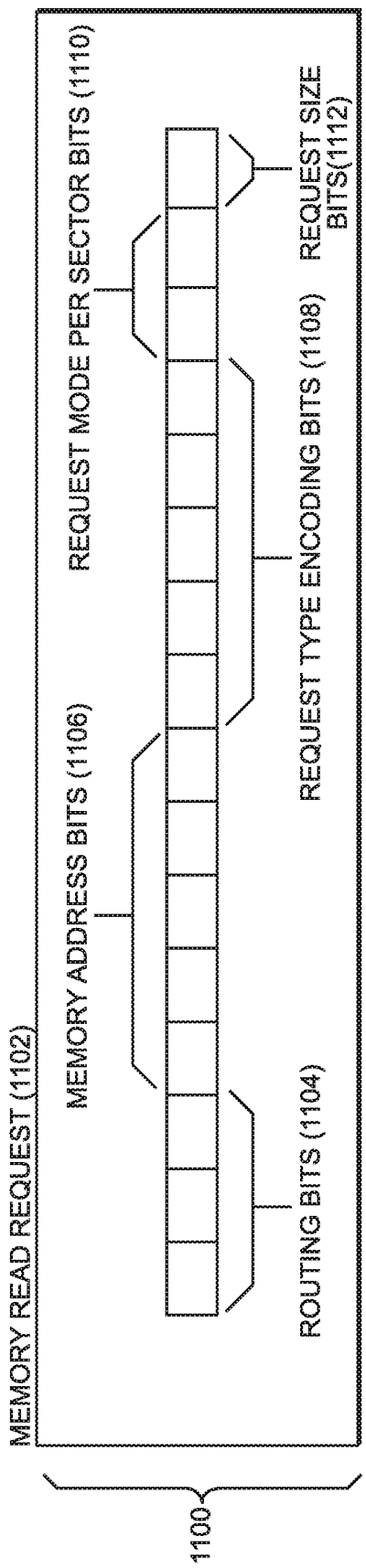
FIG. 11A is a diagram of an exemplary bit format for a memory read request that can be issued by a CPU in the processor-based system in FIG. 1 and that includes a request size and request mode for each sector of requested data.

FIG. 11A is a diagram of an exemplary bit format 1100 for an exemplary memory read request 1102 that can be issued by a requesting CPU 104(1)(1)-104(1)(C), 104(N)(1)-104(N)(D) in the processor-based system 100 in FIG. 1 based on the determined request mode for the requested data in multiple sectors to be read. As shown in FIG. 11A, the memory read request 1102 includes routing bits 1104 that provide routing information on how the memory read request 1102 is to be addressed in a memory component in the memory system 112(1)-112(N). In this example, three (3) routing bits 1104 are provided for a possibility of eight (8) routing possibilities. For example, the routing bits 1104 may represent a cache "way" for an associative cache memory. The memory read request 1102 also includes memory address bits 1106 that indicate the address of the location of the data to be read in the memory system 112(1)-112(N). In this example, the memory address bits 1106 can be any number of bits desired based on the memory line size of the memory system 112(1)-112(N) and can be used in conjunction with the routing bits 1104 to fully address a memory location in the memory system 112(1)-112(N) for the memory read request 1102. In this example, the memory read request 1102 also includes request type encoding bits 1108 to indicate a read or write operation. The request type encoding bits 1108 could also be used for providing more specificity for different types of read or write operations. For example, the request type encoding bits 1108 could be used to encode a read unique request to request data in a unique state (i.e. in a state where the requesting CPU 104(1)(1)-104(1)(C), 104(N)(1)-104(N)(D) will be sole owner of the data and the data, if present, will be invalidated in the private local cache memory 113(1)(1), 113(N)(1) of the respective non-requesting CPUs 104(1)(1)-104(1)(C), 104(N)(1)-104(N)(D). As another example, the request type encoding bits 1108 could be used to encode a shared read request where requested data can be shared and not invalidated, if present, in the private local cache memory 113(1)(1), 113(N)(1) of the respective non-requesting CPUs 104(1)(1)-104(1)(C), 104(N)(1)-104(N)(D). Also, in this example the memory read request 1102 also includes request mode per sector bits 1110 indicating for each sector (e.g., Sector 1 and Sector 0) if the requested data in memory read request 1102 has a request mode indicating a required request state or preferred request state. For example, a '0' value may be used indicate a preferred request state, whereas a '1' value may be used indicate a required request state. A request size bit 1112 is provided in the bit format 1100 for a memory read request 1102 to indicate the read request size. For example, if the memory line size has two sectors, Sector 0 and Sector 1, the request size bit 1112 can indicate if one sector (e.g., indicated by bit value '0') or both sectors (e.g., indicated by bit value '1') is requested.

Figure 11B:
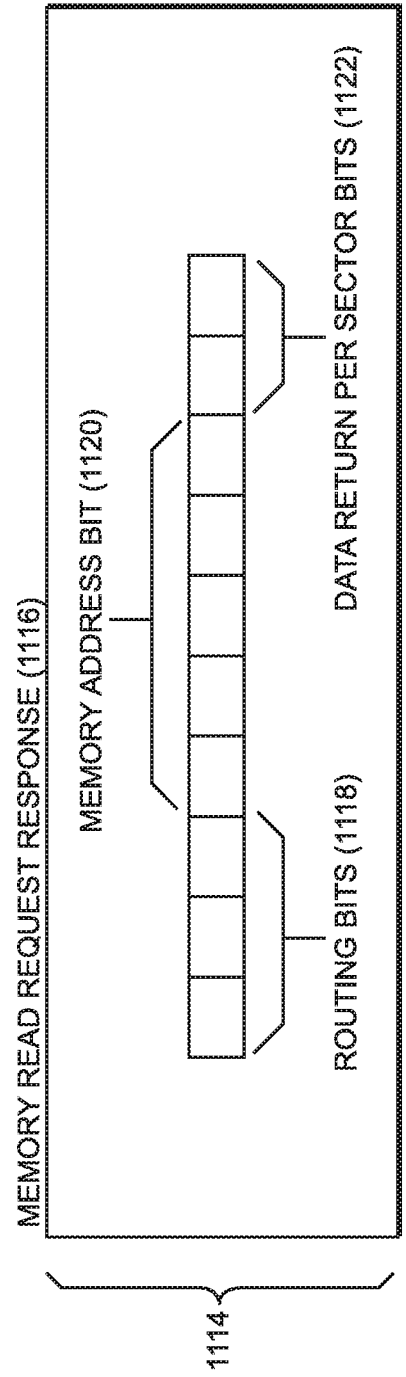
FIG. 11B is a diagram of an exemplary bit format for a memory read request that can be issued by a memory read honor circuit in the processor-based system in FIG. 1 to a requesting CPU in response to receiving a memory read request from the requesting CPU.

FIG. 11B is a diagram of an exemplary bit format 1114 of a memory read request response 1116 that can be issued by a memory read honor circuit 110(1)-110(H) in processor-based system 100 in FIG. 1 to a requesting CPU 104(1)(1)-104(1)(C), 104(N)(1)-104(N)(D) in response to intercepting and processing a multi-sector memory read request from the requesting CPU 104(1)(1)-104(1)(C), 104(N)(1)-104(N)(D). As shown in FIG. 11B, the memory read request response 1116 includes routing bits 1118 that provide routing information based on the original memory read request to be addressed in a memory component in the memory system 112(1)-112(N). The memory read request response 1116 also includes memory address bits 1120 that indicate the address of the location of the data to be read in the memory access request. These bits are used to identify the memory access request that a response is associated with since the requesting CPU 104(1)(1)-104(1)(C), 104(N)(1)-104(N)(D) may have multiple outstanding memory access requests. In this example, the memory read request response 1116 also includes data return per sector bits 1122 that are encoded with a data return state to indicate if the requested data for each sector in the memory read request 1102 was forwarded such that the requesting CPU 104(1)(1)-104(1)(C), 104(N)(1)-104(N)(D) can expect to receive the requested data for the previously issued associated memory access request. For example, a '0' value in a data return per sector bit 1122 may be used to indicate a data return of a data return state meaning the represented sector in the memory access request was forwarded and the requested data will be returned in response to the issued associated memory access request. As another example, a '1' value in a data return per sector bit 1122 may be used to indicate a data return of a data return state meaning the requested sector data in issued associated memory access request will not be returned. The requesting CPU 104(1)(1)-104(1)(C), 104(N)(1)-104(N)(D) can determine whether to reissue a memory access request for a data sector that was not fulfilled. For example, the requesting CPU 104(1)(1)-104(1)(C), 104(N)(1)-104(N)(D) may reissue a memory access request for a requested data sector that was not fulfilled at a later time, either as another preferred request state or by changing the request mode to a required request state depending on its operational design.

Figure 12:
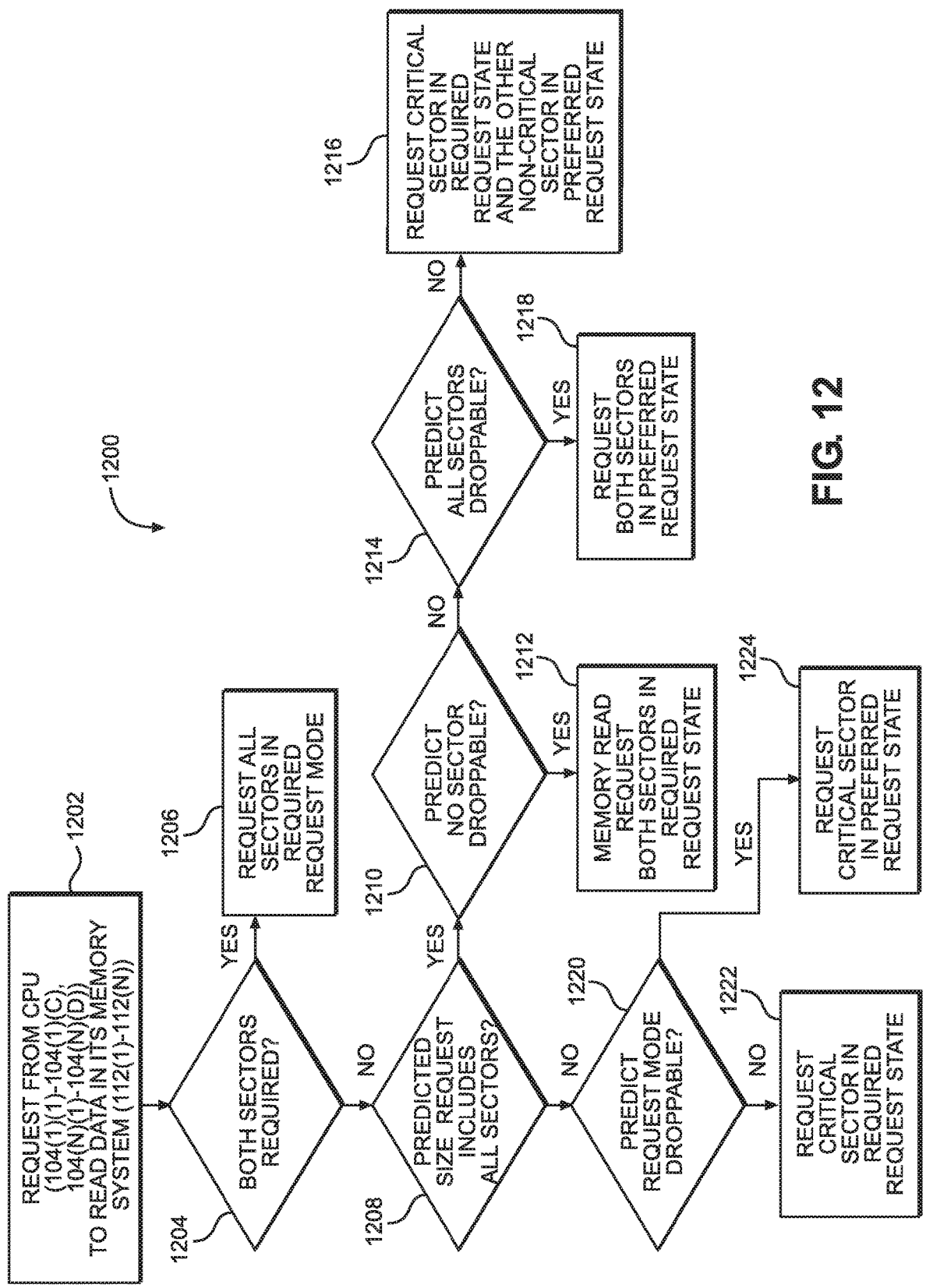
FIG. 12 is a flowchart illustrating an exemplary process of a requesting CPU in the processor-based system in FIG. 1 determining and including a request size and request mode for requested data for a multiple sector memory read request to be issued.

FIG. 12 is a flowchart illustrating an exemplary process 1200 of a requesting CPU 104(1)(1)-104(1)(C), 104(N)(1)-104(N)(D) in the processor-based system 100 in FIG. 1 determining a request mode for data to be requested and including the request mode for the requested data to be issued in a multi-sector memory access request. One example of the process 1200 in FIG. 12 assumes a multi-sector memory access request with two sectors per memory line as described by the example above, but notes that the process 1200 in FIG. 12 is not so limited. The process 1200 in FIG. 12 will be described in reference to the processor-based system 100 in FIG. 1.

In this regard, as illustrated in FIG. 1, requesting CPU 104(1)(1)-104(1)(C), 104(N)(1)-104(N)(D) in a processor 102(1)-102(N) creates a multi-sector memory read request to request read data in its memory system 112(1)-112(N) (block 1202 in FIG. 12). The requesting CPU 104(1)(1)-104(1)(C), 104(N)(1)-104(N)(D) determines if both Sectors 1 and 0 are required (block 1204 in FIG. 12). If both sectors are determined to be required, then the requesting CPU 104(1)(l)-104(1)(C), 104(N)(1)-104(N)(D) issues a memory access request that includes the memory read request with encoding that designates both Sectors 1 and 0 as having a request mode of a required request state (e.g., sets bits in request mode per sector bits 1110 in the memory read request 1102 in FIG. 11A) (block 1206). If however, both Sectors 1 and 0 are determined to not be required (block 1204 in FIG. 12), then the requesting CPU 104(1)(1)-104 (1)(C), 104(N)(1)-104(N)(D) determines if the predicted size request for the memory read request includes both Sectors 1 and 0 (e.g., 64 bytes or 128 bytes) (block 1208 in FIG. 12). For example, Sector 1 may contain the critical word and thus be required, but the requesting CPU 104(1) (1)-104(1)(C), 104(N)(1)-104(N)(D) may make a prediction with high confidence that Sector 0 from the same memory line is also required. In this case, the requesting CPU 104(1)(1)-104(1)(C), 104(N)(1)-104(N)(D) predicts if no sector is droppable, meaning both sectors are required (block 1210 in FIG. 12), and if so, the requesting CPU 104(1)(1)-104(1)(C), 104(N)(1)-104(N)(D) issues the memory read request encoded with both Sectors 1 and 0 having a request mode in a required request state (block 1212 in FIG. 12).

With continuing reference to FIG. 12, if in block 1210, the requesting CPU 104(1)(1)-104(1)(C), 104(N)(1)-104(N)(D) predicts a sector is droppable, meaning it does not have to be required, then the requesting CPU 104(1)(1)-104(1)(C), 104(N)(1)-104(N)(D) predicts if all sectors are droppable, meaning no sectors are predicted to be required (block 1214 in FIG. 12). If so, then the requesting CPU 104(1)(1)-104 (1)(C), 104(N)(D)-104(N)(D) issues the memory read request encoded with both Sectors 1 and 0 having a request mode in a preferred request state (block 1218 in FIG. 12). However, if the requesting CPU 104(1)(1)-104(1)(C), 104 (N)(1)-104(N)(D) predicts all sectors are not droppable in block 1214, meaning even a single sector is predicted to be required, then the requesting CPU 104(1)(1)-104(1)(C), 104(N)(1)-104(N)(D) issues the memory read request with the critical word sector encoded to have a request mode in a required request state and the other, non-critical word sector encoded to have a request mode in a preferred request state (block 1216 in FIG. 12).

With continuing reference to FIG. 12, if in block 1208, the requesting CPU 104(1)(1)-104(1)(C), 104(N)(1)-104(N)(D) determines the predicted size request for the memory read request does not include both Sectors 1 and 0 (e.g., 64 bytes or 128 bytes), then this means only one sector needs to be requested in the memory read request (e.g., 64 bytes of a two sector 128 byte memory line size). In this scenario, the requesting CPU 104(1)(1)-104(1)(C), 104(N)(1)-104(N)(D) then determines if the requested sector if droppable, meaning is not required (e.g., 64 bytes or 128 bytes) (block 1220 in FIG. 12). If the requested sector is determined to be droppable, then the requesting CPU 104(1)(1)-104(1)(C), 104(N)(1)-104(N)(D) issues a single sector memory read request encoded with the critical word sector encoded to have a request mode in a preferred request state (block 1224 in FIG. 12). If however, the CPU 104(1)(1)-104(1)(C), 104(N)(1)-104(N)(D) determines the requested sector is not droppable (block 1220 in FIG. 12), then the requesting CPU 104(1)(1)-104(1)(C), 104(N)(1)-104(N)(D) issues a single sector memory read request encoded with the critical word sector encoded to have a request mode in a required request state (block 1222 in FIG. 12).

If the requested data is required, then the requesting CPU 104(1)(1)-104(1)(C), 104(N)(1)-104(N)(D) issues the memory read request with the requested data having a request mode of a required request state (block 206 in FIG. 2). However, if the requested data is preferred, then the requesting CPU 104(1)(1)-104(1)(C), 104(N)(1)-104(N)(D) issues the memory read request with the requested data having a request mode of a preferred request state (block 208 in FIG. 2). The memory read request will be issued in a memory access path 124(1)-124(N) in its respective processor 102(1)-102(N) to be fulfilled by a memory in its respective memory system 112(1)-112(N) according to the memory hierarchy as discussed above.

Figure 13:
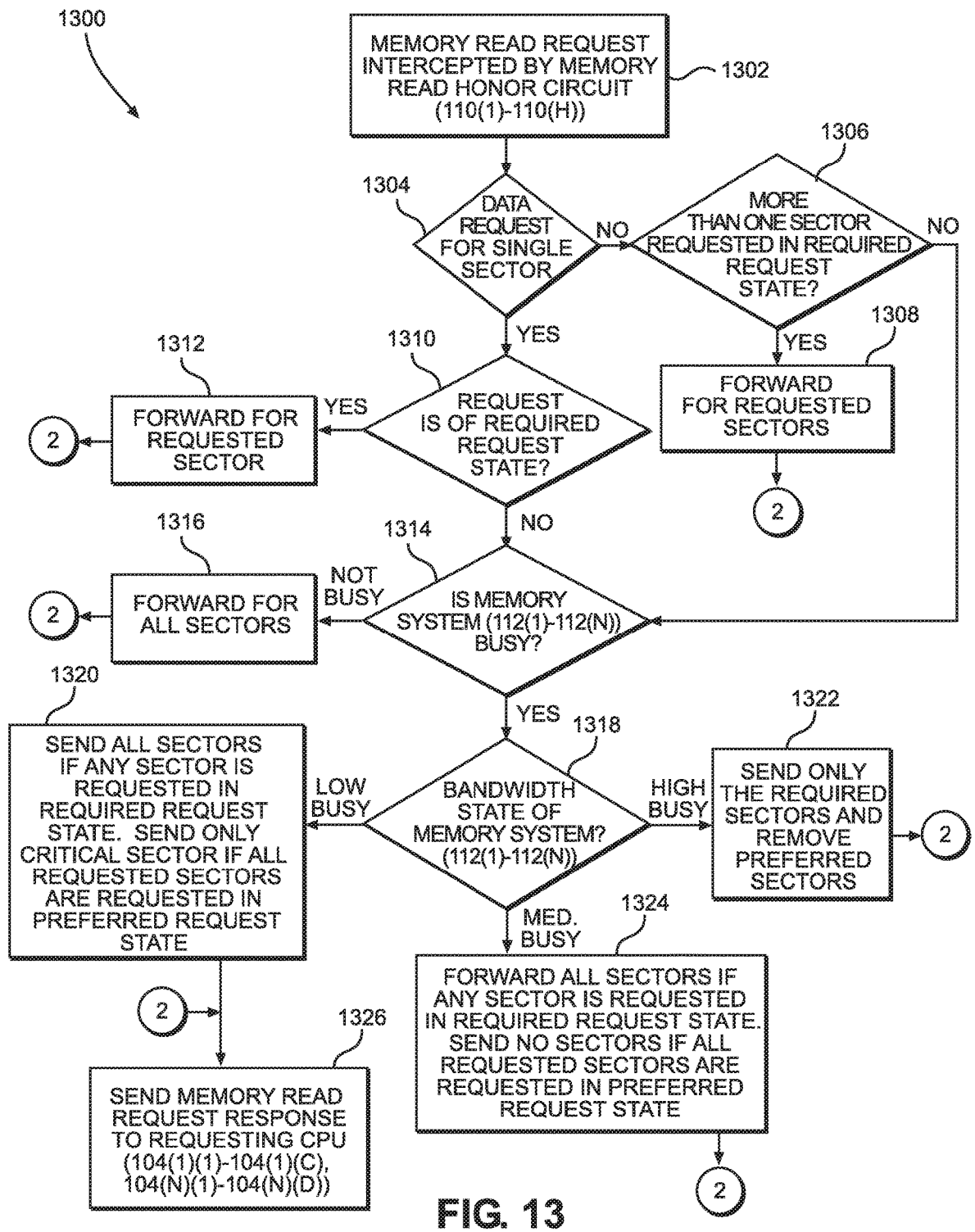
FIG. 13 is a flowchart illustrating an exemplary process of a memory read honor circuit in a cache memory or memory controller in the processor-based system in FIG. 1 configured to receive a memory read request issued by a requesting CPU according to the process in FIG. 12 and determine if the requested preferred data in the memory read request is to be forwarded based on a determined bandwidth in the memory system.

FIG. 13 is a flowchart illustrating an exemplary process 1300 of a memory read honor circuit 110(1)-110(H) coupled to a memory access path 124(1)-124(N) receiving and processing a memory read request issued by a requesting CPU 104(1)(l)-104(1)(C), 104(N)(1)-104(N)(D) in its respective processor 102(1)-102(N). The memory read honor circuits 110(1)-110(H) can intercept memory read requests if not fulfilled by a memory component in higher level portion memory access paths 124(1)-124(N) closer to the requesting CPU 104(1)(1)-104(1)(C), 104(N)(1)-104(N) (D). As shown in FIG. 13, this process 1300 starts with a memory read honor circuit 110(1)-110(H) coupled to a memory access path 124(1)-124(N) intercepting a multi-sector memory read request issued by a requesting CPU 104(1)(1)-104(1)(C), 104(N)(1)-104(N)(D) (block 1302 in FIG. 13). The memory read honor circuit 110(1)-110(H) determines if the memory read request includes a data request for a single sector in the memory line at the designated memory address or for more than one sector (block 1304 in FIG. 13). If so, then if more than one sector is requested and thus required (block 1306 in FIG. 13), then the memory read honor circuit 110(1)-110(H) forwards the memory read request in its received memory access path 124(1)-124(N) to continue towards a memory component in a memory system 112(1)-112(N) to be fulfilled (block 1308 in FIG. 13). The memory read honor circuit 110(1)-110(H) forwards the memory read request (e.g., for 128 bytes of data) if the request mode is a required request state for the memory read request, irrespective of the bandwidth state of the respective memory system 112(1)-112(N).

With continuing reference to FIG. 13, if in block 1304, the memory read honor circuit 110(1)-110(H) determines that the memory read request includes a data request for a single sector in the memory line at the designated memory address, the memory read honor circuit 110(1)-110(H) then determines if the data request for the single sector in the memory read request has a request mode of a required request state (block 1310 in FIG. 13). If so, the memory read honor circuit 110(1)-110(H) forwards the memory read request in its received memory access path 124(1)-124(N) to continue towards a memory component in a memory system 112(1)-112(N) to be fulfilled irrespective of the bandwidth state of the respective memory system 112(1)-112(N) (block 1312 in FIG. 13). If, however, the memory read honor circuit 110(1)-110(H) determines that the data request for the single sector in the memory read request has a request mode of a preferred request state (block 1310 in FIG. 13), the memory read honor circuit 110(1)-110(H) determines if the determined bandwidth state of the respective memory system 112(1)-112(N) exceeds a defined bandwidth constraint threshold for the respective memory system 112(1)-112(N) (block 1314 in FIG. 13). For example, a determined bandwidth state below the defined bandwidth constraint threshold may be deemed a "not busy" bandwidth state, whereas a determined bandwidth state above or exceeding the defined bandwidth constraint threshold may be deemed a "busy" bandwidth state. This is shown by example in table 1000 in FIG. 10 as previously described. The bandwidth state may be determined, for example, by checking the queue size in a memory access path 124(1)-124(N) and/or memory component in a memory system 112(1)-112(N). A decision in block 1306 that all sectors of the memory access request do not have a request mode of a required mode state will also cause the memory read honor circuit 110(1)-110(H) to go to block 1314 to determine if the determined bandwidth state of the respective memory system 112(1)-112(N) exceeds a defined bandwidth constraint threshold for the respective memory system 112(1)-112(N).

With continuing reference to FIG. 13, if the determined bandwidth state does not exceed the defined bandwidth constraint threshold (e.g., "not busy" in FIG. 10) (block 1314 in FIG. 13), then the memory read honor circuit 110(1)-110(H) forwards the memory read request for all sectors to the memory system 112(1)-112(N) to be fulfilled (block 1316 in FIG. 13). This is because it was determined, based on the defined bandwidth constraint threshold, that performance would not be affected in an undesired manner by fulfilling the memory read request for the requested data having a request mode of a preferred request state based on the determined bandwidth state. However, if the determined bandwidth state exceeds the defined bandwidth constraint threshold (e.g., a "busy" state in FIG. 10) (block 1314 in FIG. 13), then the memory read honor circuit 110(1)-110(H) can remove the memory read request from the memory access path 124(1)-124(N) in the memory system 112(1)-112(N). In this example, if the determined bandwidth state does not exceed the defined bandwidth constraint threshold of a "low busy" state as shown in FIG. 10 (block 1318 in FIG. 13), then the memory read honor circuit 110(1)-110(H) can forward the memory read request from the memory access path 124(1)-124(N) in the memory system 112(1)-112(N) (block 1320 in FIG. 13). The memory read honor circuit 110(1)-110(H) can include all sectors in the forwarded memory read request if any sector has a request mode in a required request state, because forwarding the data request for the non-critical sector word is deemed to not negatively affect performance given the determined "low busy" bandwidth state (block 1320 in FIG. 13). If all requested sectors in the memory read request have a request mode in a preferred request state, then the memory read honor circuit 110(1)-110(H) may only include the data request for the critical sector and remove any non-critical sectors from the forwarded memory access request to conserve bandwidth while still providing the requested data to the requesting CPU 104(1)(1)-104(1)(C), 104(N)(1)-104(N)(D) (block 1320 in FIG. 13).

With continuing reference to FIG. 13, if in block 1318, the determined bandwidth state exceeds a "low busy" state, but does not exceed the defined bandwidth constraint threshold of a "medium busy" state as shown in FIG. 10, then the memory read honor circuit 110(1)-110(H) can forward the memory read request to all sectors if any sector has a request mode in a required request state from the memory access path 124(1)-124(N) in the memory system 112(1)-112(N) (block 1324 in FIG. 13). If all sectors in the memory read request have a request mode in a preferred request state, then the memory read honor circuit 110(1)-110(H) may not forward the memory read request to conserve bandwidth since no requested data is required and since the determined bandwidth state is in a "medium busy" state to conserve bandwidth.

With continuing reference to FIG. 13, if in block 1318, the determined bandwidth state exceeds the defined bandwidth constraint threshold of a "medium busy" state, then the bandwidth state is in a "high busy" state as shown in FIG. 10. In response, the memory read honor circuit 110(1)-110(H) can forward the memory read request to include only sectors having a request mode in a required request state and remove any sectors having a request mode in a preferred request state in the memory access path 124(1)-124(N) in the memory system 112(1)-112(N) to conserve bandwidth (block 1322 in FIG. 13). In other words, in a "high busy" bandwidth state, it is deemed that it is better to only forward memory read requests with sectors having a request mode in a required request state to minimize impact on performance while still providing the requested data to the requesting CPU 104(1)(1)-104(1)(C), 104(N)(1)-104(N)(D).

Regardless of whether the requested data in any of the sectors of an intercepted memory access request has a request mode of a required or preferred request state in the process 1300 in FIG. 13, the memory read honor circuit 110(1)-110(H) is configured to send a memory read request response to the requesting CPU 104(1)(1)-104(1)(C), 104(N)(1)-104(N)(D) indicating the forward status of the memory access request (block 1326 in FIG. 13). In this manner, the requesting CPU 104(1)(1)-104(1)(C), 104(N)(1)-104(N)(D) is given notice whether to expect the requested data to be returned from the respective memory system 112(1)-112(N), and if so, the returned data size. For example, FIG. 11B, as previously discussed, illustrates an exemplary bit format 1114 of a memory read request response 1116 that can be issued by a memory read honor circuit 110(1)-110(H) in the processor-based system 100 in FIG. 1 to a requesting CPU 104(1)(1)-104(1)(C), 104(N)(1)-104(N)(D) in response to intercepting and processing a memory read request from the requesting CPU 104(1)(1)-104(1)(C), 104(N)(1)-104(N)(D).

As previously illustrated above, memory read honor circuits 110(1), 110(3) in the processor 102(1) in the processor-based system 100 in FIG. 1 may not be able to determine the bandwidth state of the separate processor 102(N). Thus, in another example, as discussed above, the memory read honor circuit 110(2) is included or associated with the transport interface circuit 126 in the processor-based system 100 in FIG. 1 so that a memory access request with a request mode of a preferred request state can be selectively fulfilled by the recipient processor 102(N) in this example, based on its bandwidth state. This is illustrated by example in the process 1400 in FIG. 14 for an example of a multi-sector memory access request.

Figure 14:
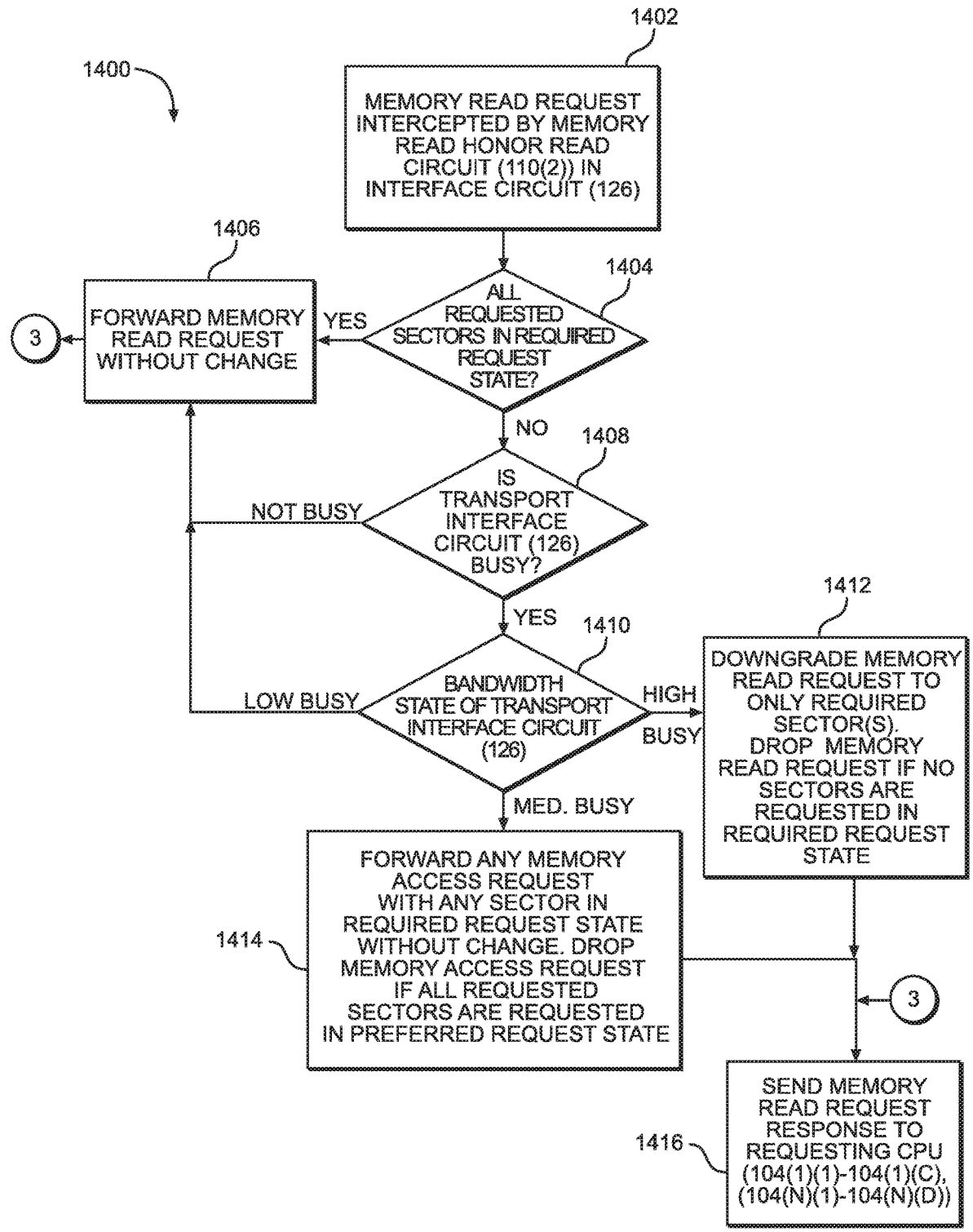
FIG. 14 is a flowchart illustrating an exemplary process of a memory read honor circuit in a transport interface circuit in the processor-based system in FIG. 1 configured to receive a memory read request issued by a requesting CPU according to the process in FIG. 12, and determine if the requested preferred data in the memory read request is to be forwarded based on a determined bandwidth in the memory system.

As illustrated in FIG. 14, the memory read honor circuit 110(2) coupled to the transport interface circuit 126 in the processor-based system 100 in FIG. 1 can be configured to intercept a memory read request issued by a requesting CPU 104(1)(1)-104(1)(C), 104(N)(1)-104(N)(D) and destined to a different processor 102(1)-102(N) (block 1402). The memory read honor circuit 110(2) determines if the request mode for all sectors of the requested data in the intercepted memory read request is a required request state (block 1404 in FIG. 14). If so, then the memory read honor circuit 110(2) forwards the memory read request in its received memory access path 124(1)-124(N) to continue towards the recipient processor 102(1)-102(N) to be fulfilled (block 1406 in FIG. 14). However, if the request mode for any sectors of the requested data in the intercepted memory read request by the memory read honor circuit 110(2) has a request mode indicating a preferred request state, then this means that at least one sector of requested data is not required by the requesting CPU 104(1)(1)-104(1)(C), 104(N)(1)-104(N)(D) to execute an instruction. Thus, it may be desired to determine the bandwidth state in the recipient processor 102(1)-102(N) first before forwarding the memory read request to determine if the bandwidth state of the recipient processor 102(1)-102(N) is in a constrained state that thus may affect its performance in an undesired manner.

In this regard, with continuing reference to FIG. 14, the memory read honor circuit 110(2) is configured to determine if the determined bandwidth state of the recipient processor 102(1)-102(N) exceeds a defined bandwidth constraint for the memory access request that includes requested data having a preferred request mode. For example, a determined bandwidth state below the defined bandwidth constraint threshold may be deemed a "not busy" bandwidth state in the recipient processor 102(1)-102(N), whereas a determined bandwidth state above or exceeding the defined bandwidth constraint threshold may be deemed a "busy" bandwidth state in the recipient processor 102(1)-102(N). The bandwidth state of the recipient processor 102(1)-102(N) may be determined, for example, by checking the queue size of the incoming request queues 128i(1)-128i(N) and/or the outgoing request queues 128o(1)-128o(N) in the transport interface circuit 126. With reference to FIG. 14, if the determined bandwidth state does not exceed the defined bandwidth constraint threshold of the recipient processor 102(1)-102(N) (block 1408), the memory read honor circuit 110(2) forwards the memory read request to the recipient processor 102(1)-102(N) (block 1406). This is because it was determined based on the defined bandwidth constraint threshold that performance of the recipient processor 102(1)-102(N) would not be affected in an undesired manner by fulfilling the memory read request for the requested data having a request mode of preferred request state based on the determined bandwidth state, even with an included sector(s) having a request mode of a preferred request state.

However, in block 1408 in FIG. 14, if the determined bandwidth state of the transport interface circuit 126 does exceed the defined bandwidth constraint threshold, then the memory read honor circuit 110(2) can be configured to modify or remove the memory read request from being communicated to the recipient processor 102(1)-102(N) based on the degree of busyness of the transport interface circuit 126. If the determined bandwidth state of the transport interface circuit 126 is deemed to be in a "low busy" state (i.e., the determined bandwidth state is lower than a defined bandwidth threshold for "low busy"), for example, as shown in FIG. 10, then the memory read honor circuit 110(2) forwards the memory read request to the recipient processor 102(1)-102(N) without modification (block 1406 in FIG. 14). This is because the design in this example is such that a "low busy" bandwidth state is deemed to not be severe enough for the transport interface circuit 126 to modify or not forward the memory access request to the recipient processor 102(1)-102(N). If, in block 1410 in FIG. 14, the determined bandwidth state of the transport interface circuit 126 higher than a defined bandwidth threshold for "low busy," it is determined whether the determined bandwidth state is below a defined bandwidth threshold for "medium busy." If so, the bandwidth state of the transport interface circuit 126 is deemed to be in a "medium busy" state, for example, as shown in FIG. 10, and the memory read honor circuit 110(2) forwards the memory access request having a request mode of a required request state from any sector without modification (block 1414 in FIG. 14). If all sectors in the memory access request have a request mode of a preferred request state, then the memory read honor circuit 110(2) drops the memory access request and does not forward it to the recipient processor 102(1)-102(N) in order to conserve bandwidth (block 1414 in FIG. 14). If, in block 1410 in FIG. 14, the determined bandwidth state of the transport interface circuit 126 exceeds a defined bandwidth threshold for "medium busy," the determined bandwidth state is deemed to be in a "high busy" state, for example, as shown in FIG. 10, and the memory read honor circuit 110(2) modifies the memory access request so that only requested data sectors having a request mode of a required request state are included in the forwarded memory access request to the recipient processor 102(1)-102(N) to conserve bandwidth (block 1412 in FIG. 14).

Regardless of whether the requested data in any of the sectors of an intercepted memory access request has a request mode of a required or preferred request state in the process 1400 in FIG. 14, the memory read honor circuit 110(2) is configured to send a memory read request response to the requesting CPU 104(1)(1)-104(1)(C), 104(N)(1)-104(N)(D) indicating the forward status of the memory access request (block 1416 in FIG. 14). In this manner, the requesting CPU 104(1)(1)-104(1)(C), 104(N)(1)-104(N)(D) is given notice whether to expect the requested data to be returned from the recipient processor 102(1)-102(N), and if so, the data size. For example, FIG. 11B, as previously discussed, illustrates an exemplary bit format 1114 of a memory read request response 1116 that can be issued by a memory read honor circuit 110(1)-110(H) in the processor-based system 100 in FIG. 1 to a requesting CPU 104(1)(1)-104(1)(C), 104(N)(1)-104(N)(D) in response to intercepting and processing a memory read request from the requesting CPU 104(1)(1)-104(1)(C), 104(N)(1)-104(N)(D).

As one example, the memory read honor circuit 110(2) may be configured to remove the memory read request by not forwarding the intercepted memory read request to the recipient processor 102(1)-102(N). In another example, the memory read honor circuit 110(2) may be configured to remove the memory address of the requested data in the memory read request. Regardless of whether the requested data in a received memory access request has a required or preferred request mode, the memory read honor circuit 110(2) in this example is configured to send a memory read request response to the requesting CPU 104(1)(1)-104(1)(C), 104(N)(1)-104(N)(D) indicating the forward status of the memory access request to the recipient processor 102

(1)-102(N) (block 812 in FIG. 5). The format of the memory read request response may be as previously described in the memory read request response 702 in FIG. 7, as an example.

Processor-based systems that include a memory read honor circuit(s) configured to selectively honor speculative memory prefetch requests from a processor based on determined bandwidth state in a memory system in the processor-based system may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 15:
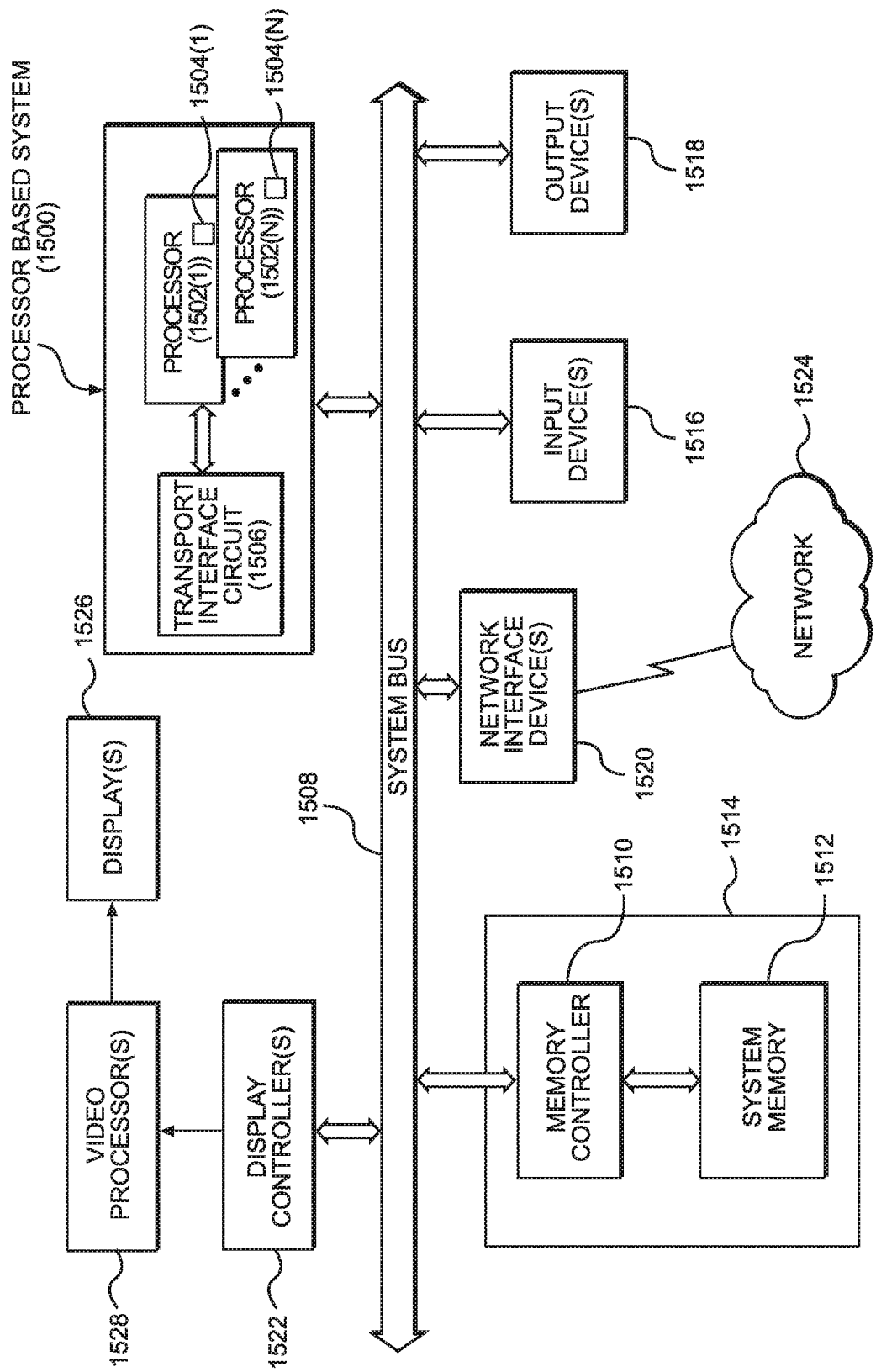
FIG. 15 is a block diagram of an exemplary processor-based system that can include multiple processors, with each processor including one or more central processing units (CPUs) and supporting inter-processor communications to access shared memory resources, and further including at least one memory read honor circuit in at least one memory access path component configured to selectively honor a memory read request issued in a processor based on the determined bandwidth state in the memory system, including but not limited to the processors in FIGS. 1 and 9.

In this regard, FIG. 15 illustrates an example of a processor-based system 1500 that includes one or more processors 1502(1)-1502(N) that can employ a memory read honor circuit 1504(1)-1504(N). The processors 1502(1)-1504(N) may also be coupled to a transport interface circuit 1506, which may be like the transport interface circuit 126 in FIG. 1. The processors 1502(1)-1502(N) are coupled to a system bus 1508 and can intercouple master and slave devices included in the processor-based system 1500. As is well known, the processors 1502(1)-1502(N) can communicate with these other devices by exchanging address, control, and data information over the system bus 1508. For example, the processors 1502(1)-1502(N) can communicate bus transaction requests to a memory controller 1510 for accessing a system memory 1512 in a memory system 1514 as an example of a slave device. Although not illustrated in FIG. 15, multiple system buses 1508 could be provided, wherein each system bus 1508 constitutes a different fabric.

Other master and slave devices can be connected to the system bus 1508. As illustrated in FIG. 15, these devices can include the memory system 1514, one or more input devices 1516, one or more output devices 1518, one or more network interface devices 1520, and one or more display controllers 1522, as examples. The input device(s) 1516 can include any type of input device, including but not limited to input keys, switches, voice processors, etc. The output device(s) 1518 can include any type of output device, including but not limited to audio, video, other visual indicators, etc. The network interface device(s) 1520 can be any devices configured to allow exchange of data to and from a network 1524. The network 1524 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1520 can be configured to support any type of communications protocol desired.

The processors 1502(1)-1502(N) may also be configured to access the display controller(s) 1522 over the system bus 1508 to control information sent to one or more displays 1526. The display controller(s) 1522 sends information to the display(s) 1526 to be displayed via one or more video processors 1528, which process the information to be displayed into a format suitable for the display(s) 1526. The display(s) 1526 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design states imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A system comprising a memory read honor circuit communicatively coupled to a memory access path, the memory read honor circuit configured to:
   intercept, from the memory access path, a memory read request issued by a central processing unit (CPU), the memory read request comprising a memory address indicating an address of requested data in a memory system and a request mode for the requested data;
   determine the request mode for the requested data in the memory read request comprises one of:
      a required request state indicating the requested data at the memory address is deemed required by the CPU; and
      a preferred request state indicating the requested data at the memory address is not deemed required by the CPU;
   in response to the request mode of the requested data in the memory read request indicating the preferred request state:
      determine a bandwidth state in the memory system;
      determine if the determined bandwidth state exceeds a defined bandwidth constraint threshold of the memory system; and
      in response to the determined bandwidth state exceeding the defined bandwidth constraint threshold of the memory system, remove the memory read request in the memory access path; and
   in response to the request mode of the requested data in the memory read request indicating the required request state, forward the memory read request in the memory access path.

2. The system of claim 1 further configured to, in response to the determined bandwidth state not exceeding the defined bandwidth constraint threshold in the memory system, forward the memory read request in the memory access path.

3. The system of claim 1 configured to remove the memory read request, by being configured to not forward the memory read request in the memory access path.

4. The system of claim 1 configured to remove the memory read request, by being configured to remove the memory address in the memory read request.

5. The system of claim 1 further configured to issue a memory read request response to the requesting CPU in response to the intercepted memory read request, the memory read request response indicating a data return state indicating if the requested data is to be returned in response to the memory read request.

6. The system of claim 5 further configured to, in response to the determined bandwidth state exceeding the defined bandwidth constraint threshold in the memory system, issue the memory read request response indicating the data return state of no return data for the requested data.

7. The system of claim 5 further configured to, in response to the determined bandwidth state not exceeding the defined bandwidth constraint threshold in the memory system, issue the memory read request response indicating the data return state of return data for the requested data.

8. The system of claim 5 further configured to, in response to the request mode of the requested data in the memory read request indicating the required request state, issue the memory read request response indicating the data return state of return data for the requested data.

9. The system of claim 1 configured to determine the bandwidth state in the memory system, being configured to determine a bandwidth of a memory controller in a processor-based system.

10. The system of claim 1 configured to determine the bandwidth state in the memory system, being configured to determine a bandwidth in the memory system of a processor in a processor-based system.

11. The system of claim 1, wherein the request mode in the memory read request further comprises a first request mode corresponding to a first sector at the memory address in the memory system and a second request mode corresponding to a second sector at the memory address in the memory system.

12. The system of claim 11 configured to:
   determine the request mode for the requested data in the memory read request, by being configured to determine the first request mode for the first sector of the requested data in the memory read request and determine the second request mode for the second sector of the requested data in the memory read request; and
   in response to at least one of the first request mode of the first sector of the requested data and the second request mode of the second sector of the requested data in the memory read request indicating the preferred request state, the memory read honor circuit further configured to:
      determine the bandwidth state in the memory system;
      determine if the determined bandwidth state exceeds the defined bandwidth constraint threshold of the memory system; and
      in response to the determined bandwidth state exceeding the defined bandwidth constraint threshold in the memory system, remove at least one sector among the first sector and the second sector of the requested data from the memory read request having a request mode indicating the preferred request state.

13. The system of claim 12 further configured to, in response to the determined bandwidth state not exceeding the defined bandwidth constraint threshold in the memory system, forward the memory read request in the memory access path.

14. The system of claim 12 further configured to, in response to at least one of the first request mode of the first sector of the requested data and the second request mode of the second sector of the requested data in the memory read request indicating the required request state, forward the memory read request comprising the at least one sector among the first sector and the second sector of the requested data having a request mode of the required request state in the memory access path.

15. The system of claim 12, wherein the memory read request further comprises a request size of the requested data at the memory address in the memory system.

16. The system of claim 12 further configured to:
   determine a request size of the requested data in the memory read request;

in response to the request size being a size of one sector among the first sector and the second sector:
  determine a request mode for the sector for the requested data among the first sector and the second sector;
  in response to the request mode of the sector for the requested data indicating the preferred request state, the memory read honor circuit further configured to, in response to the determined bandwidth state exceeding the defined bandwidth constraint threshold in the memory system, remove the requested sector of the requested data from the memory read request.

17. The system of claim 16 further configured to, in response to the determined bandwidth state exceeding the defined bandwidth constraint threshold in the memory system, forward the memory read request comprising one of the first sector and the second sector of the requested data indicating the preferred request state in the memory access path.

18. The system of claim 16 further configured to, in response to the determined bandwidth state not exceeding the defined bandwidth constraint threshold in the memory system, forward the memory read request comprising the first sector of the requested data and the second sector of the requested data in the memory access path.

19. The system of claim 16 further configured to, in response to the requested sector having a request mode indicating the required request state, forward the memory read request in the memory access path.

20. The system of claim 1 disposed into an integrated circuit (IC).

21. The system of claim 1 integrated into a device selected from a group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

22. A method of selectively honoring a memory read request issued by a central processing unit (CPU) to a memory system in a processor-based system, comprising:
  intercepting, from a memory access path in the memory system, a memory read request issued by the CPU, the memory read request comprising a memory address indicating an address of requested data in the memory system and a request mode for the requested data;
  determining the request mode for the requested data in the memory read request comprises one of:
    a required request state indicating the requested data at the memory address is deemed required by the CPU; and
    a preferred request state indicating the requested data at the memory address is not deemed required by the CPU;
  in response to the request mode of the requested data in the memory read request having a request mode indicating the preferred request state, further comprising:
    determining a bandwidth state in the memory system;
    determining if the determined bandwidth state exceeds a defined bandwidth constraint threshold of the memory system; and
    in response to the determined bandwidth state exceeding the defined bandwidth constraint threshold in the memory system, further comprising removing the memory read request in the memory access path; and
  in response to the request mode of the requested data in the memory read request having a request mode indicating the required request state, forwarding the memory read request in the memory access path.

23. The method of claim 22 further comprising, in response to the determined bandwidth state not exceeding the defined bandwidth constraint threshold in the memory system, forwarding the memory read request in the memory access path.

24. The method of claim 22, wherein removing the memory read request comprises not forwarding the memory read request in the memory access path.

25. The method of claim 22, further comprising:
  issuing a memory read request response to the requesting CPU in response to the intercepted memory read request, the memory read request response indicating a data return state indicating if the requested data is to be returned in response to the memory read request; and
  in response to the determined bandwidth state not exceeding the defined bandwidth constraint threshold in the memory system, issuing the memory read request response indicating a data return state of return data for the requested data.

26. The method of claim 22, wherein determining the bandwidth state in the memory system comprises determining a bandwidth of a memory controller in the processor-based system.

27. The method of claim 22, wherein determining the bandwidth state in the memory system comprises determining a bandwidth in the memory system of a processor in the processor-based system.

28. The method of claim 22, wherein the request mode in the memory read request further comprises a first request mode corresponding to a first sector at the memory address in the memory system and a second request mode corresponding to a second sector at the memory address in the memory system; and
  wherein:
    determining the request mode for the requested data in the memory read request comprises determining the first request mode for the first sector of the requested data in the memory read request and determining the second request mode for the second sector of the requested data in the memory read request; and
    in response to at least one of the first request mode of the first sector of the requested data and the second request mode of the second sector of the requested data in the memory read request having a request mode indicating the preferred request state:
      determining the bandwidth state in the memory system;
      determining if the determined bandwidth state exceeds the defined bandwidth constraint threshold of the memory system; and
      in response to the determined bandwidth state exceeding the defined bandwidth constraint threshold in the memory system, removing at least one sector among the first sector and the second sector of the requested data from the memory read request having a request mode indicating the preferred request state.

29. The method of claim 28, further comprising, in response to at least one of the first request mode of the first sector of the requested data and the second request mode of the second sector of the requested data in the memory read request having a request mode indicating the required request state, forwarding the memory read request comprising the at least one sector among the first sector and the second sector of the requested data having a request mode indicating the required request state in the memory access path.

30. The method of claim 28, further comprising:
determining a request size of the requested data in the memory read request;
in response to the request size being a size of one sector among the first sector and the second sector:
determining the request mode for the sector for the requested data among the first sector and the second sector;
in response to the request mode of the sector for the requested data indicating the preferred request state, further comprising, in response to the determined bandwidth state exceeding the defined bandwidth constraint threshold in the memory system, removing the requested sector of the requested data from the memory read request.

31. A processor-based system, comprising:
a processor comprising:
an interconnect bus; and
at least one cache memory communicatively coupled to the interconnect bus;
a memory system communicatively coupled to the interconnect bus and comprising a memory access path comprising:
the at least one cache memory;
a system memory; and
a memory controller communicatively coupled to the interconnect bus and the system memory, the memory controller configured to control memory accesses over the memory access path to the system memory; and
at least one central processing unit (CPU) communicatively coupled to the interconnect bus, the at least one CPU configured to issue a memory access request over the interconnect bus to the memory access path to access the memory system; and
a memory read honor circuit communicatively coupled to the memory access path in the memory system;
a requesting CPU among the at least one CPU configured to:
issue a memory read request over the interconnect bus to the memory system, the memory read request comprising a memory address indicating an address of requested data in the memory system and a request mode for the requested data; and
the memory read honor circuit configured to:
intercept, from the memory access path in the memory system, the memory read request issued by the requesting CPU;
determine the request mode for the requested data in the memory read request comprises one of:
a required request state indicating the requested data at the memory address is deemed required by the CPU; and
a preferred request state indicating the requested data at the memory address is not deemed required by the CPU;
in response to the request mode of the requested data in the memory read request having a request mode indicating the preferred request state, the memory read honor circuit further configured to:
determine a bandwidth state in the memory system;
determine if the determined bandwidth state exceeds a defined bandwidth constraint threshold of the memory system; and
in response to the determined bandwidth state exceeding the defined bandwidth constraint threshold in the memory system, remove the memory read request in the memory access path; and
in response to the request mode of the requested data in the memory read request having a request mode indicating the required request state, forward the memory read request in the memory access path.

32. The processor-based system of claim 31, wherein the memory read honor circuit is configured to determine the bandwidth state in the memory system, being configured to determine a bandwidth of the memory controller in the memory system.

33. The processor-based system of claim 31, further comprising:
a processor bus;
a processor communicatively coupled to the processor bus; and
further comprising:
a second processor communicatively coupled to the processor bus, the second processor comprising:
a second interconnect bus; and
at least one second cache memory communicatively coupled to the second interconnect bus;
the memory system further comprising:
the at least one cache memory; and
a second memory controller communicatively coupled to the second interconnect bus and the system memory, the second memory controller configured to control memory accesses over the memory access path to the system memory;
the second processor further comprising at least one second CPU communicatively coupled to the second interconnect bus, the at least one second CPU configured to issue a memory access request over the second interconnect bus to the memory access path to access the memory system; and
further comprising:
a transport interface circuit communicatively coupled to the processor and the second processor, the transport interface circuit configured to forward memory access requests between the processor comprising the requesting CPU and the second processor;
the processor further configured to:
forward the memory read request over the processor bus to the memory system in the second processor in response to the memory address of the memory read request indicating an address of requested data in the memory system in the second processor;
the memory read honor circuit communicatively coupled to the transport interface circuit;
the memory read honor circuit configured to determine the bandwidth state in the memory system, being configured to determine a bandwidth in the memory system of the second processor.

34. The processor-based system of claim 31, wherein the memory read honor circuit is further configured to, in response to the determined bandwidth state not exceeding the defined bandwidth constraint threshold in the memory system, forward the memory read request in the memory access path.

35. The processor-based system of claim 31, wherein the memory read honor circuit is further configured to issue a memory read request response to the requesting CPU in the processor in response to the intercepted memory read request, the memory read request response indicating a data return state indicating if the requested data is to be returned in response to the memory read request.

36. The processor-based system of claim 35 wherein the memory read honor circuit is further configured to, in response to the determined bandwidth state exceeding the defined bandwidth constraint threshold in the memory system, issue the memory read request response indicating the data return state of no return data for the requested data.

37. The processor-based system of claim 35 wherein the memory read honor circuit is further configured to, in response to the determined bandwidth state not exceeding the defined bandwidth constraint threshold in the memory system, issue the memory read request response indicating the data return state of return data for the requested data.

38. The processor-based system of claim 35 wherein the memory read honor circuit is further configured to, in response to the request mode of the requested data in the memory read request having a request mode indicating the required request state, issue the memory read request response indicating the data return state of return data for the requested data.

\* \* \* \* \*